(12) United States Patent
Aiki et al.

(10) Patent No.: US 12,535,634 B2
(45) Date of Patent: Jan. 27, 2026

(54) IMAGE DISPLAY DEVICE AND METHOD OF MANUFACTURING LIGHT GUIDE PLATE

(71) Applicant: SONY GROUP CORPORATION, Tokyo (JP)

(72) Inventors: Kazuma Aiki, Kanagawa (JP); Satoshi Imai, Kanagawa (JP); Hiroshi Mukawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 328 days.

(21) Appl. No.: 18/248,669

(22) PCT Filed: Sep. 15, 2021

(86) PCT No.: PCT/JP2021/033868
§ 371 (c)(1),
(2) Date: Apr. 11, 2023

(87) PCT Pub. No.: WO2022/091617
PCT Pub. Date: May 5, 2022

(65) Prior Publication Data
US 2023/0393326 A1    Dec. 7, 2023

(30) Foreign Application Priority Data
Oct. 26, 2020    (JP) ................. 2020-179035

(51) Int. Cl.
*G02B 27/01* (2006.01)
*F21V 8/00* (2006.01)

(52) U.S. Cl.
CPC ......... *G02B 6/0041* (2013.01); *G02B 6/0018* (2013.01); *G02B 6/002* (2013.01);
(Continued)

(58) Field of Classification Search
CPC ..... G02B 6/0041; G02B 6/003; G02B 6/0018
See application file for complete search history.

(56) References Cited

U.S. PATENT DOCUMENTS

2008/0239422 A1* 10/2008 Noda ................. G02B 27/0172
359/13

FOREIGN PATENT DOCUMENTS

| EP | 3287835 A1 * | 2/2018 | ............ G02B 27/02 |
| JP | 2002-503565 A | 2/2002 | |

(Continued)

OTHER PUBLICATIONS

International Search Report and Written Opinion of PCT Application No. PCT/JP2021/033868, issued on Dec. 7, 2021, 09 pages of ISRWO.

*Primary Examiner* — Sung H Pak
(74) *Attorney, Agent, or Firm* — CHIP LAW GROUP

(57) ABSTRACT

There is provided an image display device that includes a light projection system that projects image light, and a light guide system that includes a light guide plate having a reflection surface inside, the light guide plate guiding the image light from the light projection system to an eyeball, in which the light guide plate includes a light guide plate main body, and a gas layer provided in the light guide plate main body, and the reflection surface is an interface between the light guide plate main body and the gas layer. With the image display device according to the present technology, it is possible to suppress an unnecessary image from entering the fields of view of an observer and a viewer of the observer.

37 Claims, 44 Drawing Sheets

(52) U.S. Cl.
CPC ........... *G02B 6/003* (2013.01); *G02B 6/0065* (2013.01); *G02B 27/0172* (2013.01)

(56) References Cited

FOREIGN PATENT DOCUMENTS

| | | | |
|---|---|---|---|
| JP | 2003-536102 | A | 12/2003 |
| JP | 2011-053367 | A | 3/2011 |
| JP | 2012-009300 | A | 1/2012 |
| JP | 2016170372 | A | 9/2016 |

\* cited by examiner

IMAGE DISPLAY DEVICE AND METHOD OF MANUFACTURING LIGHT GUIDE PLATE

CROSS REFERENCE TO RELATED APPLICATIONS

This application is a U.S. National Phase of International Patent Application No. PCT/JP2021/033868 filed on Sep. 15, 2021, which claims priority benefit of Japanese Patent Application No. JP 2020-179035 filed in the Japan Patent Office on Oct. 26, 2020. Each of the above-referenced applications is hereby incorporated herein by reference in its entirety.

TECHNICAL FIELD

The technology according to the present disclosure (hereinafter also referred to as "the present technology") relates to an image display device and a method of manufacturing a light guide plate.

BACKGROUND ART

Conventionally, there is known an image display device that guides image light to an eyeball of an observer by a see-through type light guide plate having a metallic reflection surface inside (see, for example, Patent Document 1).

CITATION LIST

Patent Document

Patent Document 1: Japanese Patent Application Laid-Open No. 2011-53367

SUMMARY OF THE INVENTION

Problems to be Solved by the Invention

However, in the conventional image display device, there is a concern that the metallic reflection surface appears as an unnecessary image and enters the fields of view of an observer and a viewer of the observer.

Accordingly, a main object of the present technology is to provide an image display device capable of suppressing an unnecessary image from entering the fields of view of an observer and a viewer of the observer.

Solutions to Problems

The present technology provides an image display device, including:
  a light projection system that projects image light; and
  a light guide system that includes a light guide plate having a reflection surface inside, the light guide plate guiding the image light from the light projection system to an eyeball, in which
  the light guide plate includes
  a light guide plate main body, and
  a low refractive index layer provided in the light guide plate main body and having a refractive index lower than a refractive index of the light guide plate main body, and
  the reflection surface is an interface between the light guide plate main body and the low refractive index layer.

The low refractive index layer may be a gas layer.

The reflection surface may be a flat surface.

The reflection surface may be one interface of two of the interfaces facing each other, and the other interface of the two of the interfaces may be a flat surface.

The reflection surface may be one interface of two of the interfaces facing each other, and the other interface of the two of the interfaces may be a curved surface.

The light guide plate main body may include a plurality of members integrally provided, and the low refractive index layer may be provided between two members joined to each other among the plurality of members.

The reflection surface may be an interface between one of the two members and the low refractive index layer.

The two members may be joined with an adhesive layer interposed therebetween, the adhesive layer having an opening portion or a cutout portion opened to a side of at least one member of the two members, and the low refractive index layer may be the opening portion or the cutout portion.

The light guide plate main body and the adhesive layer may have translucency.

The two members may be first and second members joined to each other in a thickness direction of the light guide plate main body, the light guide plate may be disposed in such a manner that the first member faces the eyeball in the thickness direction of the light guide plate main body, and the one member may be the first member.

The first member may have a first fitting portion on a joint surface with the second member, the second member may have a second fitting portion that is substantially fitted with the first fitting portion on a joint surface with the first member, at least the first fitting portion of the first and second fitting portions may face the low refractive index layer, and the reflection surface may be an interface between the first fitting portion and the low refractive index layer.

There may be a plurality of the low refractive index layers, one of the first and second fitting portions may have a protrusion group including, as a plurality of constituent portions, a plurality of protrusions corresponding to the plurality of low refractive index layers, the other of the first and second fitting portions may have a recess group including, as a plurality of constituent portions, a plurality of recesses that corresponds to the plurality of low refractive index layers and into which the plurality of protrusions is inserted respectively, each of the constituent portions of the group included in at least the first fitting portion of the protrusion group and the recess group may face the corresponding low refractive index layer of the plurality of low refractive index layers, and an interface between each of the constituent portions of the group included in the first fitting portion and the corresponding low refractive index layer may be the reflection surface.

Each of the constituent portions of the group included in the first fitting portion may have a surface facing the corresponding low refractive index layer.

A part of the surface may face the low refractive index layer.

The entire region of the surface may face the low refractive index layer.

The light guide plate may further include an optical surface group including a plurality of optical surfaces that guides a light beam included in the image light from the light projection system to the reflection surface, and the reflection surface may reflect the light beam via the optical surface group toward the eyeball.

The optical surface group may include a light incident surface that is one end surface of the light guide plate main body and on which the image light is incident, and a total reflection surface that is one side surface in the thickness direction of the light guide plate main body and totally reflects the image light via the light incident surface.

The total reflection surface may totally reflect a light beam included in the image light via the light incident surface toward the reflection surface.

The optical surface group may include a concave mirror that is provided on an end surface of the second member facing the light incident surface and reflects a light beam included in the image light via the total reflection surface toward the reflection surface.

The light guide plate main body may include a protective member joined to the concave mirror.

The light guide plate main body may include a third member having a concave mirror that reflects a light beam included in the image light via the total reflection surface toward the reflection surface, and the concave mirror may be joined to an end surface of the second member facing the light incident surface.

The plurality of members may be stacked in a direction inclined with respect to a thickness direction of the light guide plate main body, the image light may be incident into the light guide plate main body from a light incident surface that is one end surface of the light guide plate main body, and the one member may be one of the two members that is farther from the light incident surface.

The light guide system may include a lens joined to the light incident surface, and a concave mirror that is joined to the other end surface of the light guide plate main body and reflects a light beam included in the incident image light toward the reflection surface, and one side surface in the thickness direction of the light guide plate main body may be a total reflection surface that totally reflects the image light via the lens and the light incident surface toward the concave mirror.

The light guide plate main body may include a single member, and the low refractive index layer may be a through hole or a hole provided in the light guide plate main body.

The through hole or the hole may be provided in an end surface of the light guide plate main body.

A cross section of the through hole or the hole parallel to the end surface may be inclined with respect to a thickness direction of the light guide plate main body.

The reflection surface may be one interface of two of the interfaces facing each other between the through hole or the hole and the light guide plate main body, and the other interface of the two of the interfaces may be a flat surface.

The reflection surface may by one interface of two of the interfaces facing each other between the through hole or the hole and the light guide plate main body, and the other interface of the two of the interfaces may be a curved surface.

The image light may include a plurality of light beams forming different angles of view, a plurality of the reflection surfaces may be provided corresponding to the plurality of light beams, and the plurality of the reflection surfaces may reflect the plurality of corresponding light beams incident on the eyeball at different angles of view.

The plurality of reflection surfaces may be arranged in a direction intersecting a thickness direction of the light guide plate main body.

Each of the plurality of the reflection surfaces may be an inclined surface inclined with respect to a thickness direction of the light guide plate.

The plurality of inclined surfaces may be parallel to each other.

Each of the plurality of the reflection surfaces may be one interface of two of the interfaces facing each other, and the other interface of the two of the interfaces may be a curved surface.

The low refractive index layer may be an air layer.

The present technology also provides a method of manufacturing a light guide plate having a reflection surface inside, in which
  the reflection surface is formed between two members joined to each other, and
  the method includes:
  a step of forming an adhesive layer by applying an adhesive to a joint surface of one member of the two members with the other member;
  a step of pressing a pressing surface, which is provided with a protrusion or an overhang portion protruding toward a position corresponding to a position where the reflection surface is formed on the joint surface of the one member, against the adhesive layer to insert the protrusion or the overhang portion into the adhesive layer;
  a step of curing a portion around a position of the adhesive layer where the reflection surface is formed;
  a step of separating the pressing surface from the adhesive layer to form an opening portion or a cutout portion at a position of the adhesive layer where the reflection surface is formed;
  a step of bringing a joint surface of the other member with the one member into close contact with the adhesive layer; and
  a step of curing an entire region of the adhesive layer.

The present technology also provides a method of manufacturing a light guide plate having a reflection surface inside a light guide plate main body, the method including:
  a step of producing a light guide plate base material integrated with the light guide plate main body in such a manner that a mold member penetrates at least one of a pair of end surfaces facing each other of the light guide plate main body; and
  a step of pulling out the mold member from the light guide plate base material to form a through hole or a hole in the light guide plate main body.

MODE FOR CARRYING OUT THE INVENTION

Figure 1:
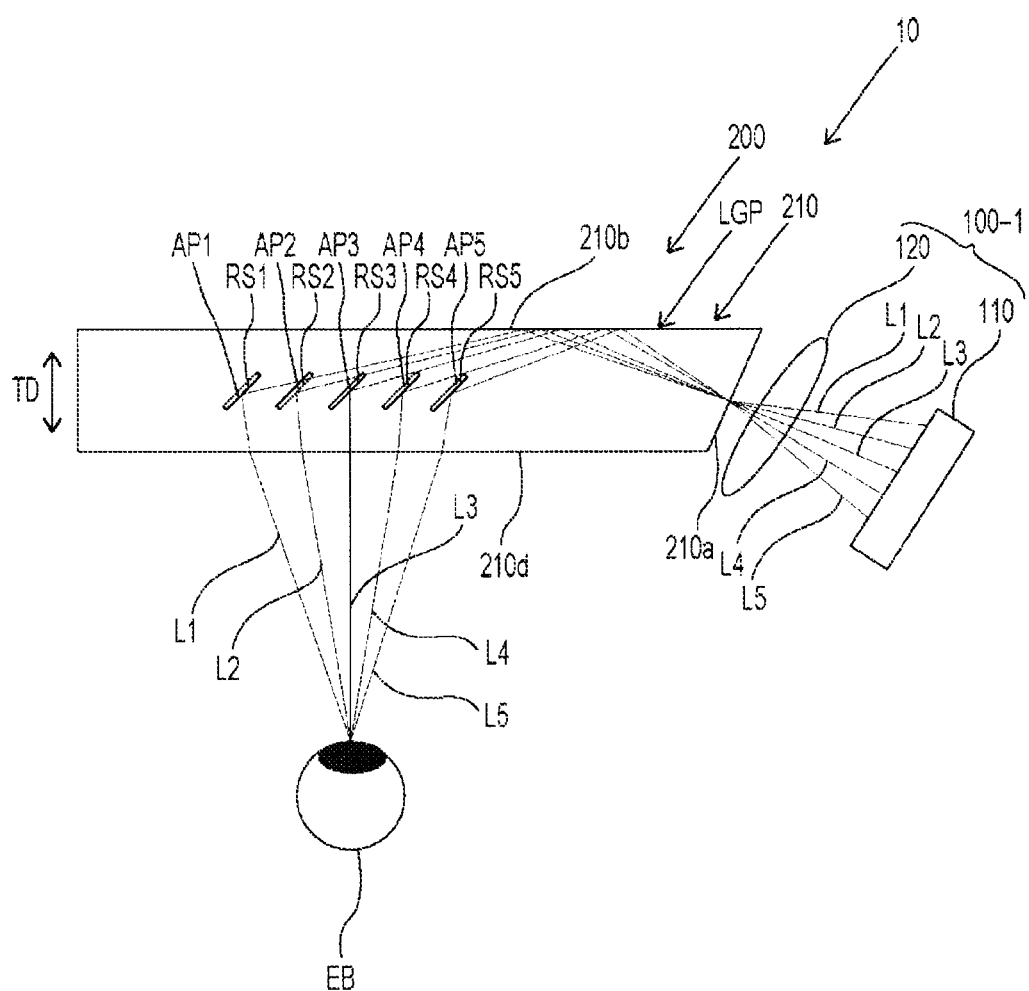
FIG. 1 is a diagram schematically illustrating a configuration of an image display device according to a first embodiment of the present technology.

Hereinafter, preferred embodiments of the present technology will be described in detail with reference to the accompanying drawings. Note that in the description and the drawings, components having substantially the same functional configuration are denoted by the same reference numerals, and redundant descriptions are omitted. The embodiments described below illustrate representative embodiments of the present technology, and the scope of the present technology is not narrowly interpreted by these embodiments. In the description, even in a case where it is described that an image display device and a method of manufacturing a light guide plate according to the present technology exhibit a plurality of effects, the image display device and the method of manufacturing the light guide plate according to the present technology is only required to exhibit at least one effect. The effects described herein are merely examples and are not limited, and other effects may be provided.

Furthermore, description will be given in the following order.
1. Introduction
2. Configuration of image display device according to first embodiment of present technology
3. Light guide plate of image display device according to Example 1 of first embodiment of present technology
4. Light guide plate of image display device according to Example 2 of first embodiment of present technology
5. Light guide plate of image display device according to Example 3 of first embodiment of present technology
6. Effects of image display device and method of manufacturing light guide plate of image display device according to first embodiment of the present technology
7. Image display device according to Example 1 of second embodiment of present technology
8. Image display device according to Example 2 of second embodiment of present technology
9. Image display device according to Example 1 of third embodiment of present technology
10. Image display device according to Example 2 of third embodiment of present technology
11. Image display device according to Example 3 of third embodiment of present technology
12. Modification of present technology 1. Introduction Conventionally, an image display device including a see-through type light guide plate incorporating a plurality of reflectors is known. In such an image display device, since light use efficiency in the light guide plate is high, for example, it is also possible to use a self-luminous element such as an organic EL element in which it is difficult to increase luminance, and a compact image display device can be achieved.

Incidentally, an aluminum (Al) coating film is often used as a reflector used for such a light guide plate. The reason is that aluminum has high reflectance, uniform reflection spectrum, and no color among metals, is highly reliable unlike silver that turns black when oxidized, and is inexpensive.

For this reason, the aluminum coating film is employed for the reflector installed in the light guide plate, but there is a concern that the external appearance of the light guide plate is uncomfortable. The plurality of reflectors is installed in the light guide plate to achieve high efficiency and image luminance uniformity. However, when the light guide plate incorporating the plurality of reflectors is used in a head-mounted (for example, eyeglass-type) image display device, a dot pattern (unnecessary image) by the plurality of reflectors in the light guide plate appears in a field of view of a wearer, which makes the wearer feel annoyed, and thus may cause avoidance of use. This is because a metal film such as the aluminum coating film does not transmit light at all and has glossiness peculiar to metals. Thus, preventing an unnecessary image from entering the field of view of the wearer (observer) leads to improvement of the feeling of use.

Furthermore, the head-mounted image display device has an odd appearance when viewed from another person in a worn state (in addition, since light transmittance of the reflector is low and the pupil of the wearer cannot be seen, the other person may feel uncomfortable), which may cause avoidance of use. Thus, it is also important to improve the feeling of use by eliminating such an appearance impression.

Accordingly, as a result of intensive studies, the inventors have developed the image display device of the present technology as an image display device capable of suppressing an unnecessary image from entering the field of view of the observer and a viewer of the observer, and improving the feeling of use. Hereinafter, some embodiments of the image forming device of the present technology will be described in detail.

2. Configuration of Image Display Device According to First Embodiment of Present Technology An image display device 10 according to a first embodiment of the present technology will be described with reference to the drawings.

As an example, the image display device 10 is an image display device that directly draws an image on the retina by retinal direct drawing using light, and is used for providing a user with augmented reality (AR) or the like, for example.

FIG. 1 is a diagram schematically illustrating a configuration of the image display device 10 according to the first embodiment. Hereinafter, for convenience, in FIG. 1, description will be given on the assumption that a left side of a paper surface is left, a right side of the paper surface is right, a near side of the paper surface is top, and a far side of the paper surface is bottom.

The image display device 10 functions as, for example, a head mounted display (HMD) used by being worn on the head of the user (observer). The HMD is also called eyewear, for example.

An image display device 10-1 includes a light projection system 100-1 and a light guide system 200.

The image display device 10-1 may further include a control system that controls the light projection system 100-1.

The light projection system 100-1 and the light guide system 200 are integrally provided in the same support structure (for example, a spectacle frame). The control system described above may be provided integrally with the support structure or may be provided separately.

Hereinafter, the description will be given on the premise that a spectacle frame as an example of the support structure is mounted on the head of the user.
(Light Projection System)

The light projection system 100-1 projects image light. The image light includes a plurality of light beams (for example, L1 to L5) forming different angles of view. Each light beam may include a single color light beam or may include a plurality of color light beams (for example, light of three colors of red, green, and blue).

The light projection system 100-1 includes an image forming unit 110 and a projection lens 120.

Note that the light projection system may be an optical scanning type including a light source (for example, a laser or the like) and an optical deflector (for example, a MEMS mirror, a galvanometer mirror, a polygon mirror, or the like).

The image forming unit 110 forms an image with light and emits image light.

The image forming unit 110 includes, for example, an image display panel including a plurality of display elements arranged two-dimensionally. Each display element may be a self-light emitting type such as a laser, an LED, or an organic EL element, or may be a dimming type such as a liquid crystal element requiring a separate light source, for example. Each display element is driven by a drive circuit. The drive circuit drives the display element on the basis of modulation data transmitted from the control system described above.

The projection lens 120 is disposed on an optical path of image light from the image forming unit 110, and projects the image light toward a light guide plate LGP as described later. More specifically, the projection lens 120 is, for example, a condenser lens, and condenses image light on a light incident surface 210a of the light guide plate LGP as described later.

(Light Guide System)

The light guide system 200 includes the light guide plate LGP having at least one reflection surface RS (for example, RS1 to RS5) therein that guides the image light from the light projection system 100-1 to the eyeball. The light guide plate LGP may be a type (spectacle lens type) fitted into a spectacle frame as the support structure described above, or may be a type (combiner type) externally attached to the spectacle frame.

The light guide plate LGP includes a light guide plate main body 210 and a low refractive index layer provided in the light guide plate main body 210 and having a refractive index lower than that of the light guide plate main body 210. The low refractive index layer is, for example, a gas layer (gas phase).

The light guide plate main body 210 is a plate-like body having translucency. The plate-shaped body is formed by, for example, transparent or translucent glass or resin.

The gas layer is, for example, an opening portion AP (for example, AP1 to AP5) provided in the light guide plate main body 210. The gas layer is, for example, an air layer, a nitrogen layer, or the like.

The reflection surface RS described above is an interface between the light guide plate main body 210 and the opening portion AP to be the gas layer. More specifically, the reflection surface RS1 is an interface between the light guide plate main body 210 and the opening portion AP1. The reflection surface RS2 is an interface between the light guide plate main body 210 and the opening portion AP2. The reflection surface RS3 is an interface between the light guide plate main body 210 and the opening portion AP3. The reflection surface RS4 is an interface between the light guide plate main body 210 and the opening portion AP4. The reflection surface RS5 is an interface between the light guide plate main body 210 and the opening portion AP5.

The reflection surface RS is, for example, a flat surface. The reflection surface RS preferably has as high flatness as possible.

The reflection surface RS has, for example, a rectangular shape, a circular shape, an elliptical shape, or the like in plan view.

The reflection surface RS is one interface of two of the interfaces facing each other between the light guide plate main body 210 and the low refractive index layer (for example, the gas layer). The other interface of the two of the interfaces is a flat surface.

The light guide plate main body 210 further includes an optical surface group including a plurality of optical surfaces that guides the image light from the light projection system 100-1 to the reflection surface RS.

The optical surface group includes the light incident surface 210a that is one end surface of the light guide plate main body 210 and on which the image light is incident, and a total reflection surface 210b that is one side surface in the thickness direction TD of the light guide plate main body 210 and that totally reflects the image light via the light incident surface 210a.

The total reflection surface 210b totally reflects a light beam included in the image light via the light incident surface 210a toward the reflection surface RS. That is, the light beam via the light incident surface 210a is incident on the total reflection surface 210b at an incident angle at which the light beam is totally reflected by the total reflection surface 210b.

The reflection surface RS reflects (totally reflects) a light beam included in the image light (the image light via the optical surface group) via the total reflection surface 210b toward an eyeball EB. That is, the light beam via the total reflection surface 210b is incident on the reflection surface RS at an incident angle at which the light beam is totally reflected by the reflection surface RS.

Note that the light beam incident from the light incident surface 210a may be totally reflected a plurality of times between the total reflection surface 210b and a light emission surface 210d and propagated toward the reflection surface RS.

The light beam via the reflection surface RS is incident on the eyeball EB via the light emission surface 210d that is the other side surface in the thickness direction TD of the light guide plate main body 210.

The plurality of (for example, five) reflection surfaces RS (for example, RS1 to RS5) is regularly arranged (for example, periodically, at equal intervals, or the like) in an in-plane direction (a direction orthogonal to the thickness direction TD) of the light guide plate main body 210 as an example. The plurality of reflection surfaces RS is parallel to each other as an example. The reflection surfaces RS1 to RS5 are provided corresponding to the light beams L1 to L5 included in the image light, respectively.

Note that the plurality of reflection surfaces RS is not limited to the direction orthogonal to the thickness direction of the light guide plate main body 210, and in short, preferably, the reflection surfaces RS are provided side by side in a direction intersecting the thickness direction of the light guide plate main body 210.

The light beam L1 forming the maximum angle of view on one side of the image light projected from the light projection system 100-1 is incident into the light guide plate main body 210 via the light incident surface 210a, totally reflected by the total reflection surface 210b, and incident on the corresponding reflection surface RS1. The light beam L1 reflected by the reflection surface RS1 is refracted by the light emission surface 210d and is incident on the eyeball EB so as to form a left maximum angle of view.

The light beam L3 forming a central angle of view of the image light projected from the light projection system 100-1 is incident into the light guide plate main body 210 via the light incident surface 210a, totally reflected by the total reflection surface 210b, and incident on the corresponding reflection surface RS3. The light beam L3 reflected by the reflection surface RS3 is incident on the eyeball EB so as to pass straight through the light emission surface 210d and form the central angle of view.

The light beam L2 forming an intermediate angle of view between the maximum angle of view on one side and the central angle of view of the image light projected from the light projection system 100-1 is incident into the light guide plate main body 210 via the light incident surface 210a, totally reflected by the total reflection surface 210b, and incident on the corresponding reflection surface RS2. The light beam L2 reflected by the reflection surface RS2 is refracted by the light emission surface 210d and is incident on the eyeball EB so as to form the intermediate angle of view between the left maximum angle of view and the central angle of view.

The light beam L5 forming the maximum angle of view on the other side of the image light projected from the light projection system 100-1 is incident into the light guide plate main body 210 via the light incident surface 210a, totally reflected by the total reflection surface 210b, and incident on the corresponding reflection surface RS5. The light beam L5 reflected by the reflection surface RS5 is refracted by the light emission surface 210d and is incident on the eyeball EB so as to form a right maximum angle of view.

The light beam L4 forming an intermediate angle of view between the maximum angle of view on the other side and the central angle of view of the image light projected from the light projection system 100-1 is incident into the light guide plate main body 210 via the light incident surface 210a, totally reflected by the total reflection surface 210b, and incident on the corresponding reflection surface RS4. The light beam L4 reflected by the reflection surface RS4 is refracted by the light emission surface 210d and is incident on the eyeball EB so as to form the intermediate angle of view between the right maximum angle of view and the central angle of view.

As described above, the plurality of reflection surfaces RS1 to RS5 reflects the plurality of incident light beams L1 to L5 and causes the light beams L1 to L5 to be incident (condensed) on the eyeball EB at different angles of view.

3. Light Guide Plate of Image Display Device According to Example 1 of First Embodiment Configuration of Light Guide Plate of Image Display Device According to Example 1 of First Embodiment Hereinafter, a configuration of a light guide plate LGP1 of the image display device according to Example 1 of the first embodiment will be described with reference to FIG. 2. The image display device according to Example 1 has a similar configuration to that of the image display device 10 except including the light guide plate LGP1 as an example of the light guide plate LGP of the image display device 10.

Figure 2:
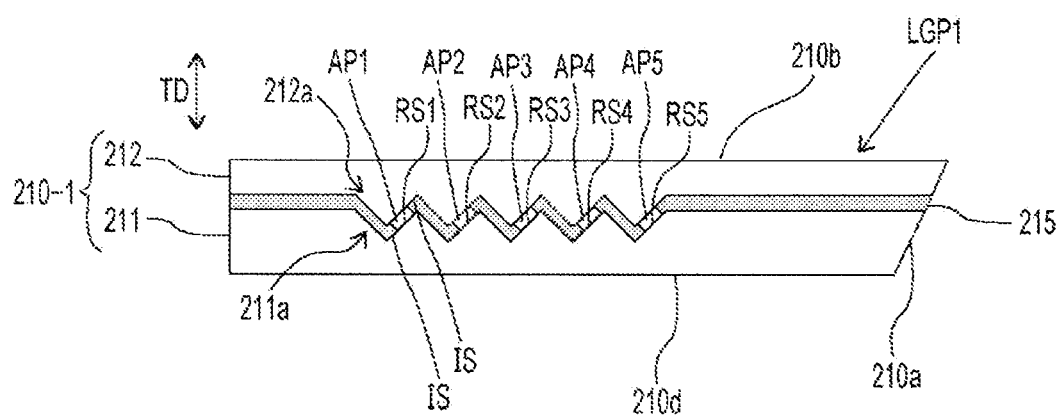
FIG. 2 is a cross-sectional view of a light guide plate of an image display device according to Example 1 of the first embodiment of the present technology.
Figure 3:
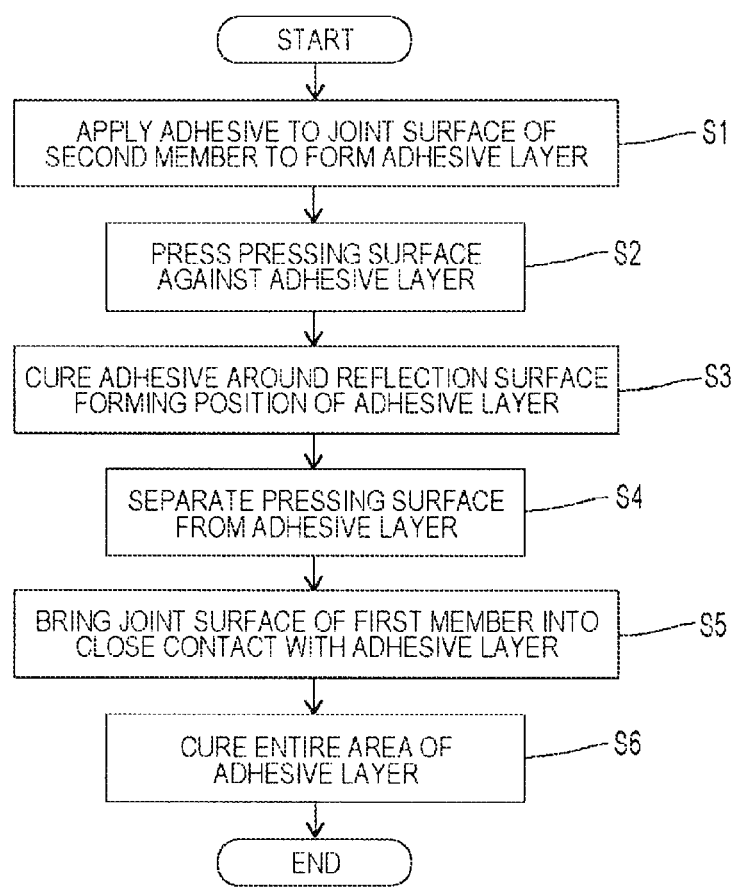
FIG. 3 is a flowchart for explaining a method of manufacturing the light guide plate of FIG. 2.
Figure 4:
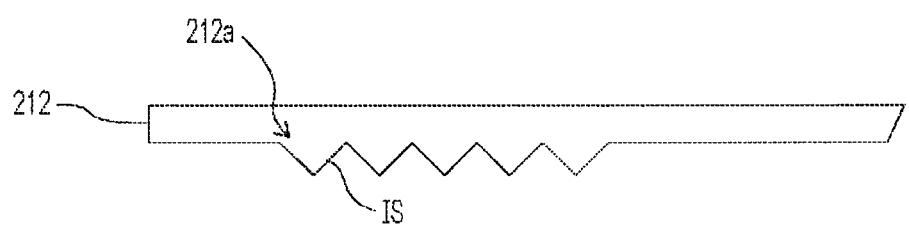
FIG. 4 is a cross-sectional view (part 1) illustrating the method of manufacturing the light guide plate of FIG. 2 for each process.

As illustrated in FIG. 2, a light guide plate main body 210-1 of the light guide plate LGP1 includes a plurality of (for example, two) members 211 and 212 provided integrally. The two members 211 and 212 are joined to each other. A gas layer is provided between the two members 211 and 212. The reflection surface RS (for example, RS1 to RS5) is an interface between one member 211 of the two members and the gas layer (opening portion AP to be described later). The two members 211 and 212 have substantially the same refractive index.

The two members 211 and 212 described above are joined with an adhesive layer 215 interposed therebetween, the adhesive layer 215 having an opening portion AP (for example, AP1 to AP5) opened to a side of at least one member of the two members 211 and 212. Here, each opening portion AP of the adhesive layer 215 is open to either member side of the two members 211 and 212. Each opening portion AP is a gas layer.

The adhesive layer 215 has translucency. Specifically, the adhesive layer 215 is made by a transparent or translucent adhesive.

The viscosity of the adhesive layer 215 are preferably 1000 to 10000 Pa·s, and more preferably 2000 to 5000 Pa·s. The refractive index of the adhesive layer 215 is substantially the same as the refractive index of the two members 211 and 212. The adhesive layer 215 is made by, for example, an ultraviolet-curable adhesive.

The two members 211 and 212 are joined to each other in the thickness direction TD of the light guide plate main body. Hereinafter, the two members 211 and 212 are also referred to as first and second members 211 and 212, respectively. That is, the light guide plate LGP1 includes the first and second members 211 and 212 and the adhesive layer 215.

The light guide plate LGP1 is disposed in such a manner that the first member 211 faces the eyeball EB in the thickness direction TD of the light guide plate main body 210-1 (see FIG. 1), and the reflection surface RS is an interface between the opening portion AP and the first member 211.

The first and second members 211 and 212 are manufactured, for example, by injection molding using resin or the like as a material or by cutting glass.

The first member 211 has a first fitting portion 211a on a joint surface with the second member 212. The second member 212 has a second fitting portion 212a substantially fitted with the first fitting portion 211a on a joint surface with the first member 211. At least the first fitting portion 211a of the first and second fitting portions 211a and 212a faces the opening portion AP. The reflection surface RS is an interface between the first fitting portion 211a and the opening portion AP.

One of the first and second fitting portions 211a and 212a has a protrusion group including a plurality of (for example, five) protrusions corresponding to the plurality of opening portions AP (for example, AP1 to AP5) as a plurality of constituent portions. The other of the first and second fitting portions 211a and 212a has a recess group including, as a plurality of constituent portions, a plurality of (for example, five) recesses that corresponds to the plurality of opening portions AP (for example, AP1 to AP5) and into which the plurality of protrusions is inserted respectively (for example, substantially fitted).

Each constituent portion (protrusion or recess) of the group included in at least the first fitting portion 211a of the protrusion group and the recess group faces the corresponding opening portion AP of the plurality of opening portions AP. An interface between each constituent portion of the group included in the first fitting portion 211a and the corresponding opening portion AP is the reflection surface RS.

As an example, each constituent portion of the group included in the first fitting portion 211a has a surface facing the opening portion AP that is a corresponding gas layer. The surface is, for example, an inclined surface IS inclined with respect to the thickness direction TD of the light guide plate main body 210-1. As an example, the inclined surfaces IS of each constituent portion (protrusion or recess) of the group included in the first fitting portion 211a are parallel to each other. The flatness of the reflection surface RS depends on flatness of the inclined surface IS, and thus the flatness of the inclined surface IS is preferably sufficiently increased by, for example, surface polishing or the like.

Each opening portion AP is formed in a region corresponding to an intermediate portion that is a portion between one end portion and the other end portion of the inclined surface IS facing each other of the respective constituent portions (protrusion or recess) of the first and second fitting portions 211a and 212a. That is, here, a part (intermediate portion) of the inclined surface IS of each constituent portion (protrusion or recess) of the first fitting portion 211a faces the opening portion AP that is a gas layer.

Method of Manufacturing Light Guide Plate of Image Display Device According to Example 1 of First Embodiment Hereinafter, a method of manufacturing the light guide plate of the image display device according to Example 1 of the first embodiment will be described with reference to a flowchart of FIG. 3 and FIGS. 4 to 12.

Figure 5:
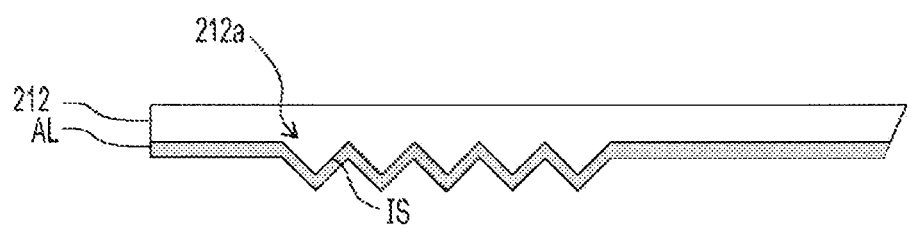
FIG. 5 is a cross-sectional view (part 2) illustrating the method of manufacturing the light guide plate of FIG. 2 for each process.

In the first step S1, for example, an adhesive is applied to the entire region of the joint surface of the second member 212 (see FIG. 4) produced by injection molding to form the adhesive layer AL (see FIG. 5).

Figure 6:
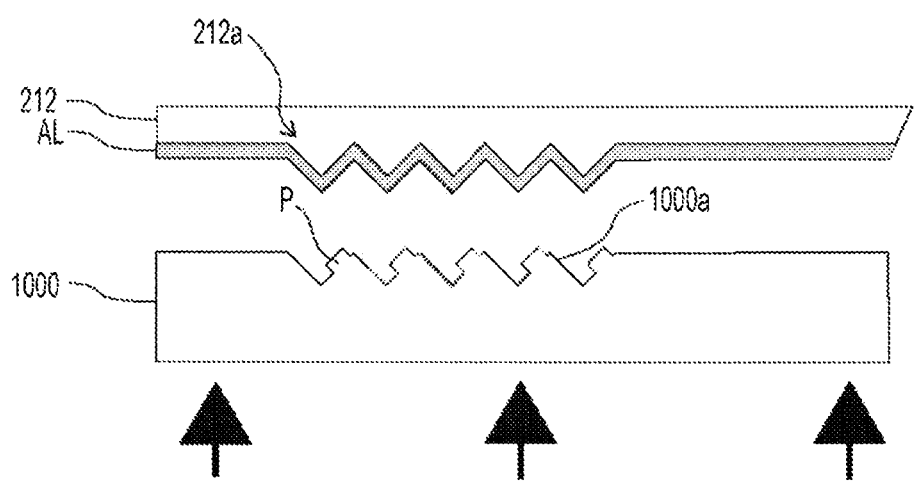
FIG. 6 is a cross-sectional view (part 3) illustrating the method of manufacturing the light guide plate of FIG. 2 for each process.
Figure 7:
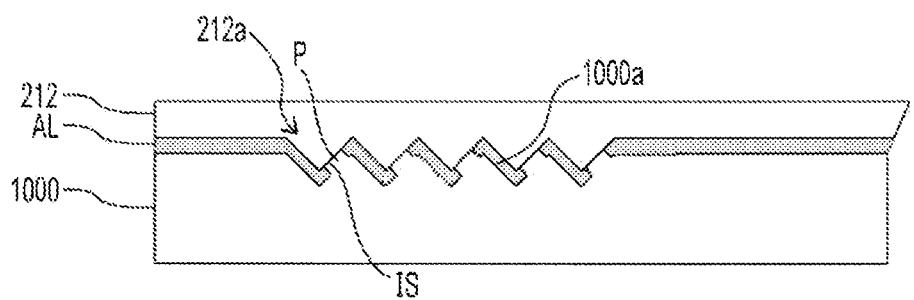
FIG. 7 is a cross-sectional view (part 4) illustrating the method of manufacturing the light guide plate of FIG. 2 for each process.

In the next step S2, a pressing standing surface 1000a of the pressing member 1000 is pressed against the adhesive layer AL (see FIGS. 6 and 7). The pressing surface 1000a is a surface having a shape substantially corresponding to the shape of the joint surface of the second member 212 as a whole, and is a surface having a protrusion P that protrudes toward the inclined surface IS of each constituent portion (protrusion or recess) of the second fitting portion 212a facing the lower right side of the drawing. When the pressing surface 1000a is pressed against the adhesive layer AL, the protrusion P is inserted into a reflection surface forming position of the adhesive layer AL (see FIG. 7). At this time, the protrusion P pushes away the adhesive at the reflection surface forming position of the adhesive layer AL. Note that it is preferable to apply, for example, a release agent to the pressing surface 1000a so that the pressing member 1000 can be smoothly removed from the adhesive layer AL later.

Figure 8:
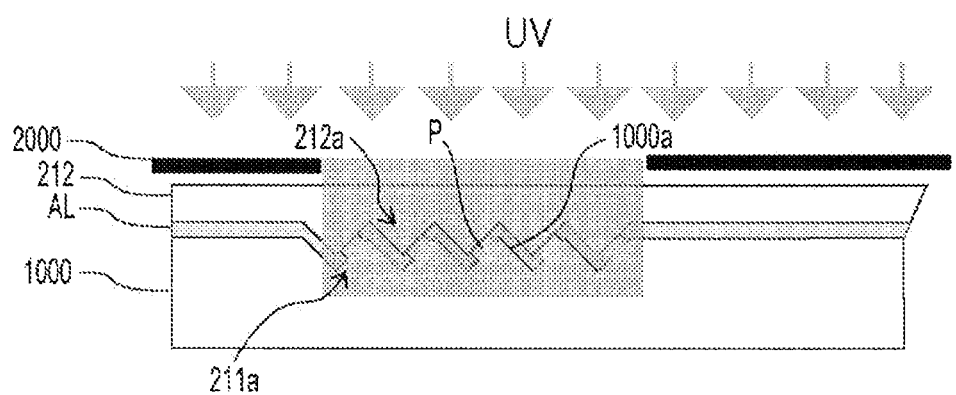
FIG. 8 is a cross-sectional view (part 5) illustrating the method of manufacturing the light guide plate of FIG. 2 for each process.

In the next step S3, the adhesive around the reflection surface forming position of the adhesive layer AL is cured. Specifically, only the adhesive around the reflection surface forming position, which is the adhesive near the first and second fitting portions 211a and 212a in the adhesive layer AL, is irradiated with ultraviolet rays UV (see FIG. 8). In addition, as illustrated in FIG. 8, the irradiation with ultraviolet rays UV is performed while the adhesive other than the adhesive around the reflection surface forming position in the adhesive layer AL is masked with a light shielding plate so that the adhesive is not irradiated with the ultraviolet rays UV.

Figure 9:
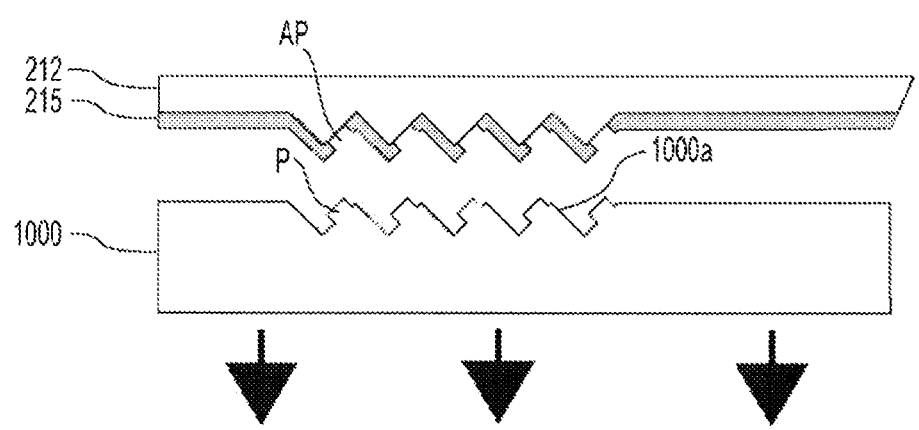
FIG. 9 is a cross-sectional view (part 6) illustrating the method of manufacturing the light guide plate of FIG. 2 for each process.

In the next step S4, the pressing surface 1000a is separated from the adhesive layer AL (see FIG. 9). Consequently, the adhesive layer 215 having the opening portion AP is formed.

Figure 10:
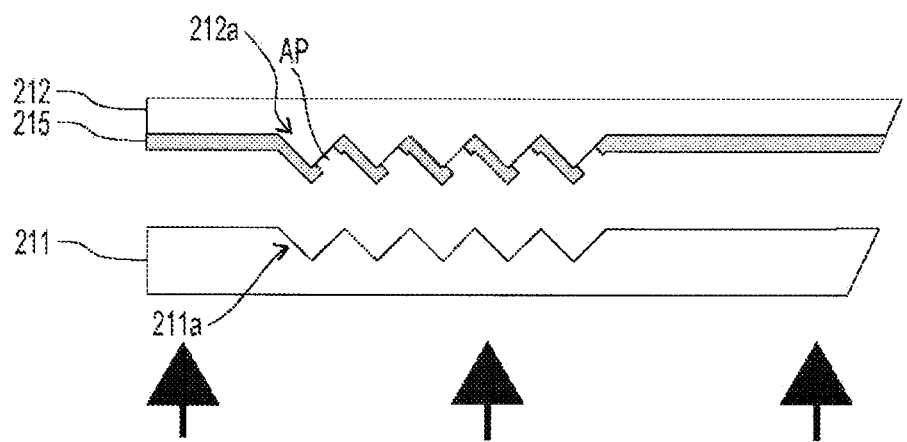
FIG. 10 is a cross-sectional view (part 7) illustrating the method of manufacturing the light guide plate of FIG. 2 for each process.
Figure 11:
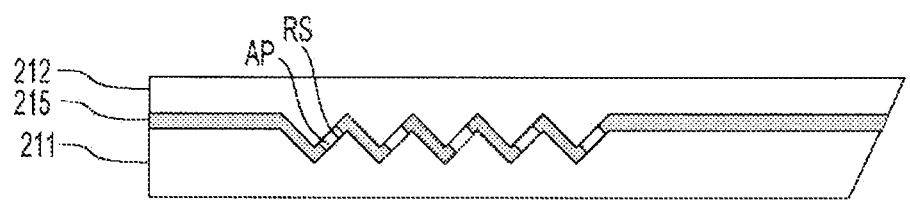
FIG. 11 is a cross-sectional view (part 8) illustrating the method of manufacturing the light guide plate of FIG. 2 for each process.
Figure 12:
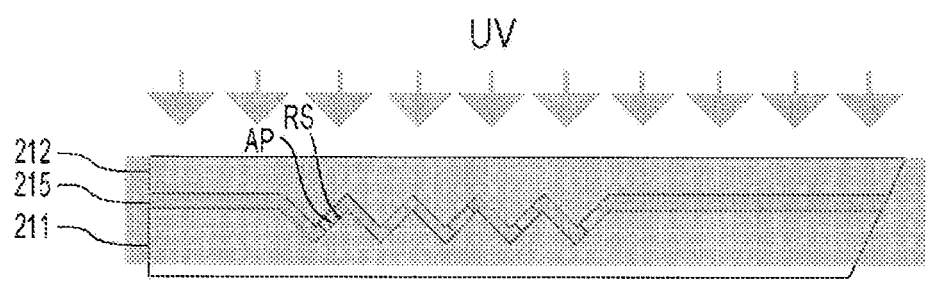
FIG. 12 is a cross-sectional view (part 9) illustrating the method of manufacturing the light guide plate of FIG. 2 for each process.

In the next step S5, a portion other than a reflection surface forming position of the joint surface of the first member 211 is brought into close contact with the adhesive layer 215 (see FIGS. 10 and 11). Specifically, the joint surface of the first member 211 is brought into close contact with the adhesive layer 215 such that the first and second fitting portions 211a and 212a are substantially fitted with each other. As a result, the reflection surface RS that is an interface between the opening portion AP and the first member 211 is formed (see FIG. 11).

Note that when step S5 is performed, for example, in air, the opening portion AP becomes an air layer, and when step S5 is performed, for example, in a nitrogen atmosphere, the opening portion AP becomes a nitrogen layer. That is, the opening portion AP becomes a gas layer containing the same gas as the gas of the atmosphere in which step S5 is performed.

In the final step S6, the entire region of the adhesive layer 215 is cured. Specifically, the entire region of the adhesive layer 215 is irradiated with the ultraviolet rays UV (see FIG. 12).

4. Light Guide Plate of Image Display Device According to Example 2 of First Embodiment Configuration of Light Guide Plate of Image Display Device According to Example 2 of First Embodiment Hereinafter, a configuration of a light guide plate LGP2 of the image display device according to Example 2 of the first embodiment will be described with reference to FIG. 13. The image display device according to Example 2 has a similar configuration to that of the image display device 10 except including the light guide plate LGP2 as an example of the light guide plate LGP of the image display device 10.

Figure 13:
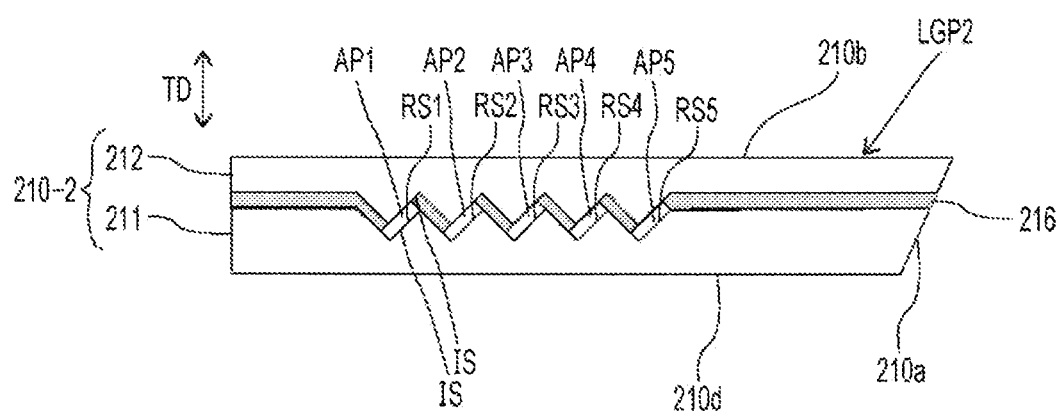
FIG. 13 is a cross-sectional view of a light guide plate of an image display device according to Example 2 of the first embodiment of the present technology.

As illustrated in FIG. 13, the light guide plate LGP2 has a similar configuration to that of the light guide plate LGP1 (see FIG. 2) except for the configuration of the adhesive layer.

In the light guide plate LGP2, each opening portion AP is formed in a region corresponding to the entire region of the inclined surface IS of each constituent portion (protrusion or recess) of the first fitting portion 211a of the light guide plate main body 210-2. That is, the entire region of the inclined surface IS of each constituent portion (protrusion or recess) of the first fitting portion 211a faces the opening portion AP that is a gas layer.

Method of Manufacturing Light Guide Plate of Image Display Device According to Example 2 of First Embodiment Hereinafter, a method of manufacturing the light guide plate of the image display device according to Example 2 of the first embodiment will be described with reference to FIGS. 14 to 20. This manufacturing method is also performed in a procedure similar to the procedure illustrated in the flowchart of FIG. 3.

Figure 14:
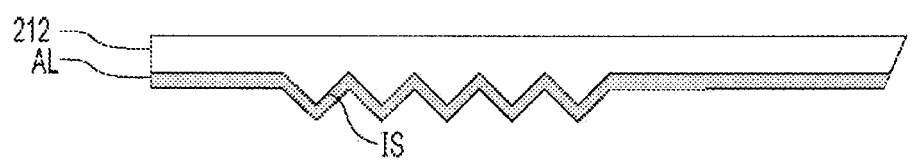
FIG. 14 is a cross-sectional view (part 1) illustrating the method of manufacturing the light guide plate of FIG. 13 for each process.

First, for example, an adhesive is applied to the entire region of the joint surface of the second member 212 (see FIG. 4) produced by injection molding to form the adhesive layer AL (see FIG. 14).

Figure 15:
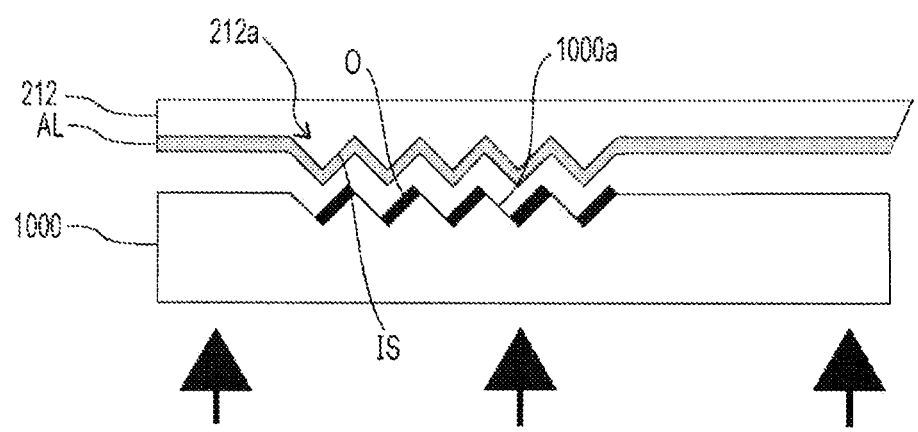
FIG. 15 is a cross-sectional view (part 2) illustrating the method of manufacturing the light guide plate of FIG. 13 for each process.
Figure 16:
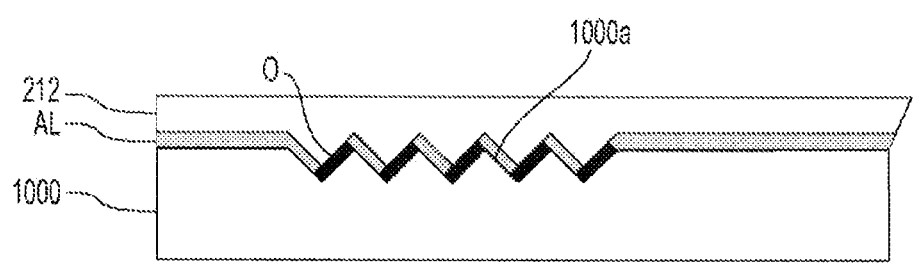
FIG. 16 is a cross-sectional view (part 3) illustrating the method of manufacturing the light guide plate of FIG. 13 for each process.

Next, the pressing standing surface 1000a of the pressing member 1000 is pressed against the adhesive layer AL (see FIGS. 15 and 16). The pressing surface 1000a is a surface having a shape substantially corresponding to the shape of the joint surface of the second member 212 as a whole, and is a surface having an overhang portion O (black portion) overhanging toward the inclined surface IS of each constituent portion (protrusion or recess) of the second fitting portion 212a facing the lower right side of the drawing. When the pressing surface 1000a is pressed against the adhesive layer AL, the overhang portion O is inserted into the reflection surface forming position of the adhesive layer AL (see FIG. 16). At this time, the overhang portion O pushes away the adhesive at the reflection surface forming position of the adhesive layer AL. Note that it is preferable to apply, for example, a release agent to the pressing surface 1000a so that the pressing member 1000 can be smoothly removed from the adhesive layer AL later.

Figure 17:
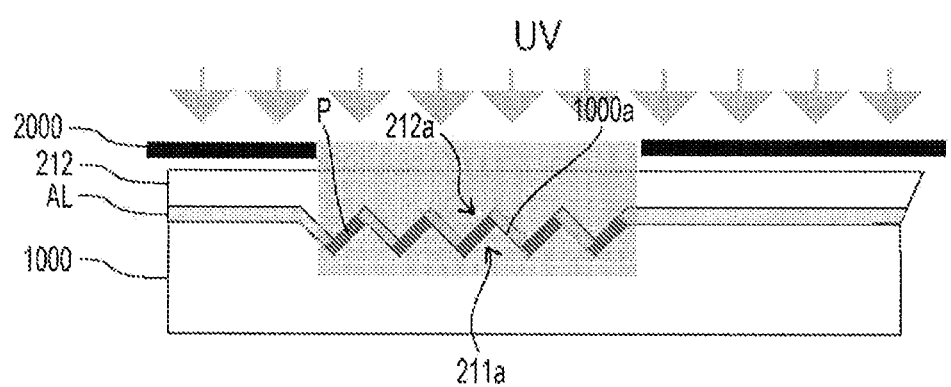
FIG. 17 is a cross-sectional view (part 4) illustrating the method of manufacturing the light guide plate of FIG. 13 for each process.

Next, the adhesive around the reflection surface forming position of the adhesive layer AL is cured. Specifically, only the adhesive around the reflection surface forming position, which is the adhesive near the first and second fitting portions 211a and 212a in the adhesive layer AL, is irradiated with ultraviolet rays UV (see FIG. 17). In addition, as illustrated in FIG. 17, the irradiation with ultraviolet rays UV is performed while the adhesive other than the adhesive around the reflection surface forming position in the adhesive layer AL is masked with a light shielding plate so that the adhesive is not irradiated with the ultraviolet rays UV.

Figure 18:
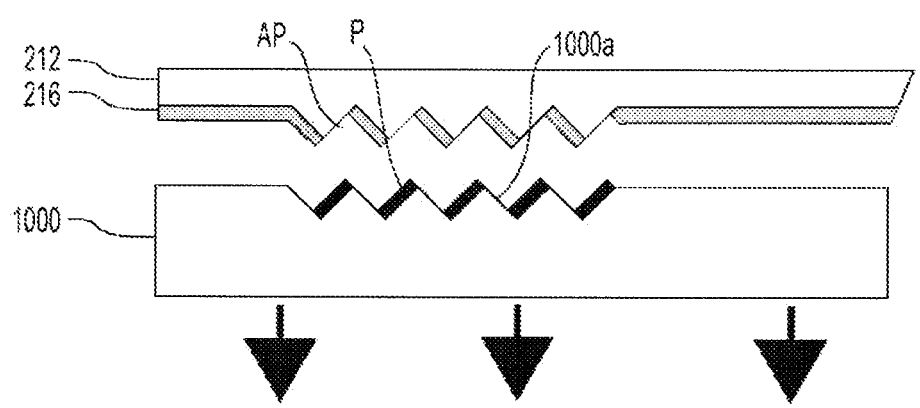
FIG. 18 is a cross-sectional view (part 5) illustrating the method of manufacturing the light guide plate of FIG. 13 for each process.

Next, the pressing surface 1000a is separated from the adhesive layer AL (see FIG. 18). Consequently, an adhesive layer 216 having the opening portion AP is formed.

Figure 19:
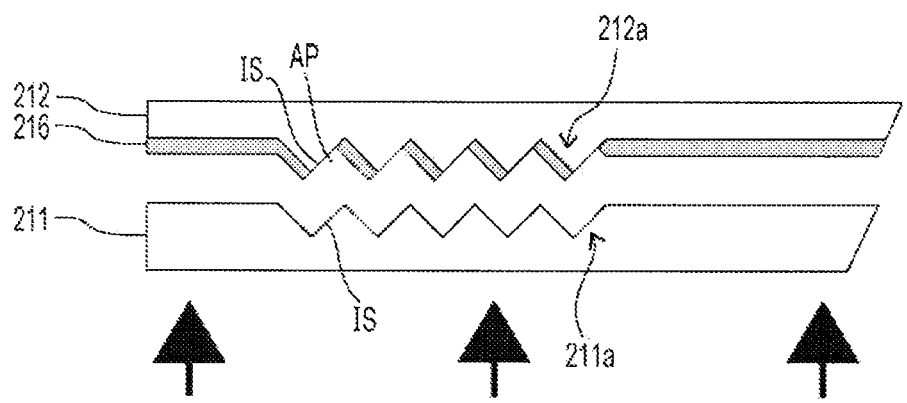
FIG. 19 is a cross-sectional view (part 6) illustrating the method of manufacturing the light guide plate of FIG. 13 for each process.
Figure 20:
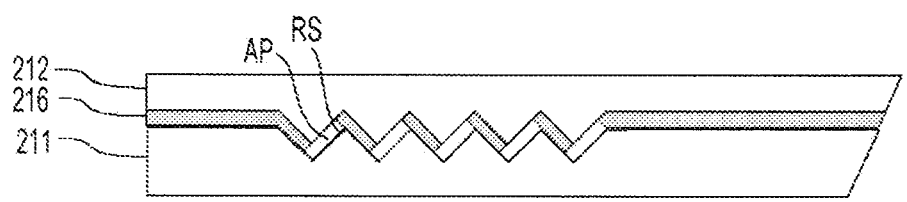
FIG. 20 is a cross-sectional view (part 7) illustrating the method of manufacturing the light guide plate of FIG. 13 for each process.

Next, a portion other than the reflection surface forming position of the joint surface of the first member 211 is brought into close contact with the adhesive layer 216 (see FIGS. 19 and 20). Specifically, the joint surface of the first member 211 is brought into close contact with the adhesive layer 216 such that the first and second fitting portions 211a and 212a are substantially fitted with each other. As a result, the reflection surface RS that is an interface between the opening portion AP and the first member 211 is formed (see FIG. 20).

Figure 21:
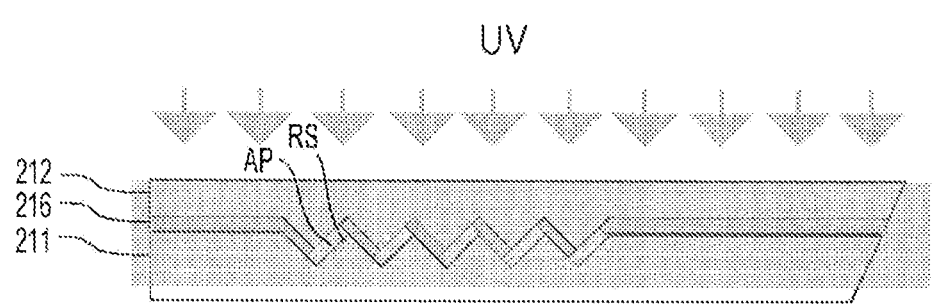
FIG. 21 is a cross-sectional view (part 8) illustrating the method of manufacturing the light guide plate of FIG. 13 for each process.

Finally, the entire region of the adhesive layer 216 is cured. Specifically, the entire region of the adhesive layer 216 is irradiated with the ultraviolet rays UV (see FIG. 21).

Figure 22A:
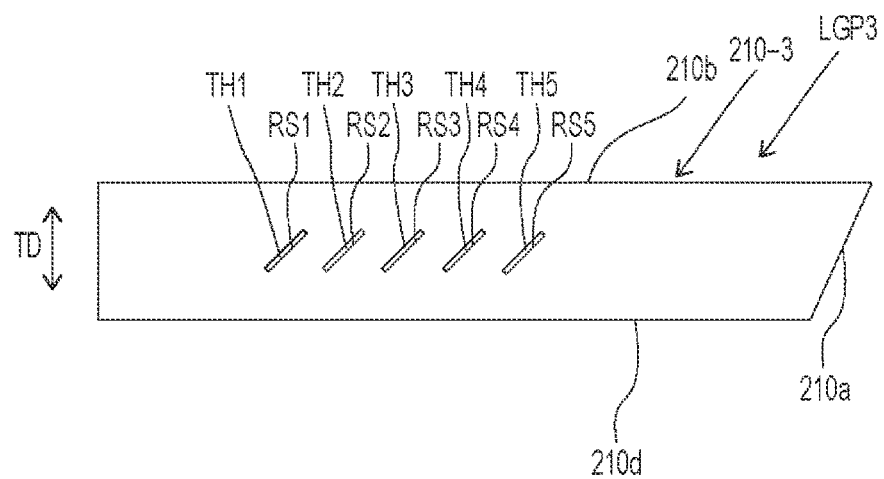
FIG. 22A is a cross-sectional view of a light guide plate of an image display device according to Example 3 of the first embodiment of the present technology.
Figure 22B:
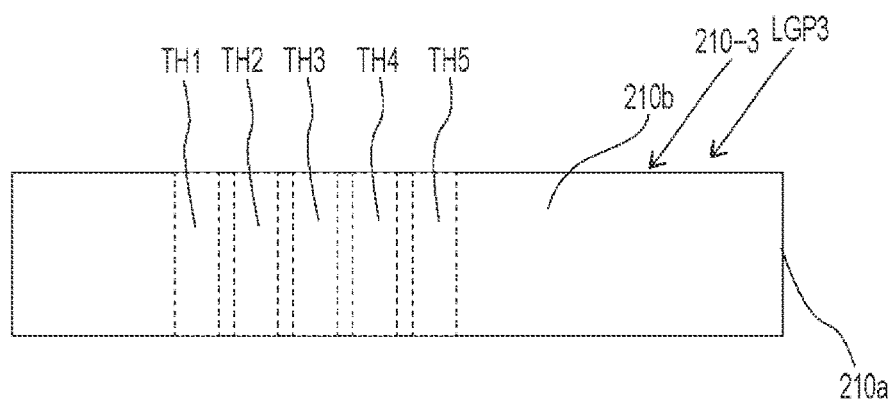
FIG. 22B is a plan view of the light guide plate of the image display device according to Example 3 of the first embodiment of the present technology.
Figure 23:
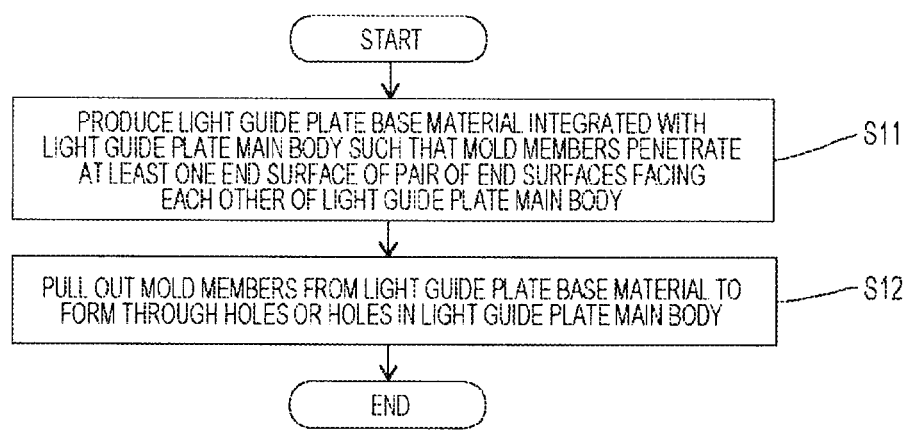
FIG. 23 is a flowchart for explaining a method of manufacturing the light guide plate in FIGS. 22A and 22B.

5. Light Guide Plate of Image Display Device According to Example 3 of First Embodiment Configuration of Light Guide Plate of Image Display Device According to Example 3 of First Embodiment Hereinafter, a configuration of a light guide plate LGP3 of the image display device according to Example 3 of the first embodiment will be described with reference to FIGS. 22A and 22B. FIG. 22B is a plan view of the light guide plate LGP3. FIG. 22A is a cross-sectional view of FIG. 22B. The image display device according to Example 3 has a similar configuration to that of the image display device 10 except including the light guide plate LGP3 as an example of the light guide plate LGP of the image display device 10.

In the light guide plate LGP3, as illustrated in FIGS. 22A and 22B, a light guide plate main body 210-3 is formed by a single member. The light guide plate main body 210-3 is provided with through holes TH (for example, TH1 to TH5). An interface between the light guide plate main body 210-3 and the through hole TH is the reflection surface RS (for example, RS1 to RS5).

The through hole TH is provided in the end surface of the light guide plate main body 210-3. More specifically, the through hole TH penetrates a pair of opposing end surfaces of the light guide plate main body 210-3 (see FIG. 22B). The through holes TH (for example, TH1 to TH5) are inclined with respect to the thickness direction TD of the light guide plate main body 210-3 (see FIG. 22A).

The reflection surface RS is one interface of two interfaces facing each other between the through hole TH and the light guide plate main body 210-3, and the other interface of the two interfaces is a flat surface.

Note that, instead of the through hole TH, a hole penetrating one of the pair of end surfaces facing each other may be formed in the light guide plate main body 210-3. In this case, the interface between the hole and the light guide plate main body 210-3 can be used as the reflection surface RS.

Method of Manufacturing Light Guide Plate of Image Display Device According to Example 3 of First Embodiment Hereinafter, a method of manufacturing the light guide plate LGP3- of the image display device according to Example 3 of the first embodiment will be described with reference to a flowchart of FIG. 23, and FIGS. 24A, 24B, and 25.

Figure 24A:
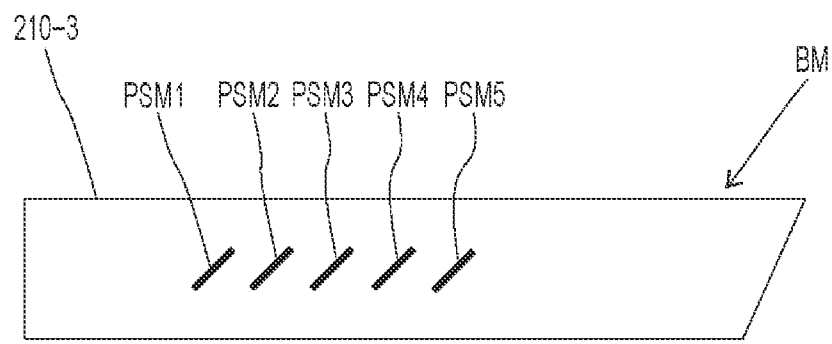
FIGS. 24A and 24B are a cross-sectional view and a plan view (part 1), respectively, illustrating the method of manufacturing the light guide plate of FIGS. 22A and 22B for each process.
Figure 24B:
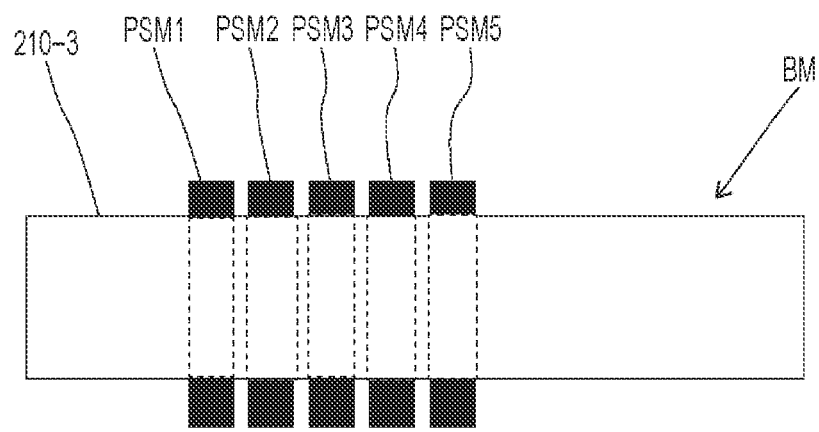

In first step S11, as illustrated in FIGS. 24A and 24B, a light guide plate base material BM integrated with the light guide plate main body 210-3 in such a manner that a plurality of plate-shaped mold members PSM (for example, PSM1 to PSM5) penetrates a pair of end surfaces facing each other of the light guide plate main body 210-3 is produced. Specifically, the light guide plate base material BM is manufactured by injecting glass or resin into a mold for forming the light guide plate main body 210-3 and performing injection molding while maintaining a state in which the plurality of plate-shaped mold members PSM is periodically arranged in parallel with each other (for example, at equal intervals).

Note that, in order to easily pull out the plate-shaped mold member PSM from the light guide plate base material BM later, a release agent may be applied to the plate-shaped mold member PSM in advance.

Figure 25:
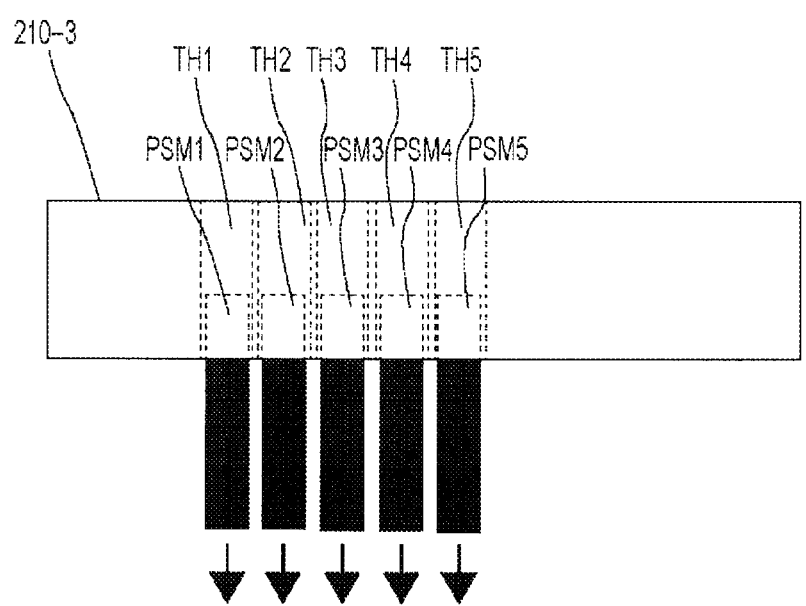
FIG. 25 is a plan view (part 2) illustrating the method of manufacturing the light guide plate of FIGS. 22A and 22B for each process.

In final step S12, as illustrated in FIG. 25, the plurality of plate-shaped mold members PSM (for example, PSM1 to PSM5) is pulled out from the light guide plate base material BM to form a plurality of through holes TH (for example, TH1 to TH5) in the light guide plate main body 210-3.

Note that the light guide plate base material BM integrated with the light guide plate main body 210-3 in such a manner that the plurality of plate-shaped mold members PSM penetrates one of the pair of end surfaces facing each other of the light guide plate main body 210-3 may be produced, and the plurality of plate-shaped mold members PSM may be pulled out from the light guide plate base material BM to form the plurality of holes in the light guide plate main body 210-3. The plurality of holes is preferably inclined with respect to the thickness direction TD of the light guide plate main body 210-3, for example, and is more preferably parallel to each other.

Here, the plate-shaped mold member is used as an example of the mold member integrated with the light guide plate main body 210-3, but a mold member having another shape may be used.

6. Effects of Image Display Device and Method of Manufacturing Light Guide Plate of Image Display Device According to First Embodiment The image display device 10 according to the first embodiment described above includes the light projection system 100-1 that projects image light, and the light guide system 200 that includes a light guide plate LGP (for example, LGP1 to 3) having the reflection surface RS inside, the light guide plate guiding the image light from the light projection system 100-1 to the eyeball EB, in which the light guide plate LGP includes the light guide plate main body 210 (for example, 210-1 to 210-3), the gas layer (for example, an opening portion AP) as a low refractive index layer provided in the light guide plate main body 210 and having a refractive index lower than that of the light guide plate main body 210, and the reflection surface RS is an interface between the light guide plate main body 210 and the gas layer.

With the image display device 10, since the reflection surface RS is the interface between the light guide plate main body 210 and the low refractive index layer, it is possible to suppress an unnecessary image (for example, a pattern) from entering the field of view of the observer and the viewer of the observer.

Moreover, since the reflection surface RS has higher reflectance than the metal film and has a uniform spectrum, the light use efficiency can be improved.

Incidentally, if the other interface facing the reflection surface RS, which is one interface of two of the interfaces facing each other between the low refractive index layer (for example, the gas layer) and the light guide plate main body, is a curved surface, when another person looks at the eyeball of the observer through the light guide plate, the eyeball seems to have bubbles, and there is a possibility that the observer feels uncomfortable. Accordingly, since the other interface facing the reflection surface RS is a flat surface, it is possible to suppress such an uncomfortable feeling.

Furthermore, since the reflection surface RS is a flat surface, sufficient resolving power can be obtained. Moreover, in a case where the reflection surface RS is a flat surface, that is, in a case where the surface facing the gas layer of the light guide plate main body 210 is a flat surface, the flatness of the surface is increased, so that the resolving power can be improved particularly in a case where the light beam incident on the reflection surface RS includes a plurality of color light beams.

The light guide plate main body 210-1 or 210-2 includes a plurality of members 211 and 212 integrally provided, and the gas layer is provided between two members 211 and 212 joined to each other among the plurality of members. With this arrangement, the gas layer can be relatively easily formed.

The reflection surface RS is an interface between one member 211 of the two members 211 and 212 and the gas layer. With this arrangement, the gas layer can be relatively easily formed, and the flatness of the reflection surface RS can be easily and sufficiently increased.

The two members 211 and 212 are joined with the adhesive layer 215 or 216 interposed therebetween, the adhesive layer 215 or 216 having the opening portion AP that opens to a side of at least one member 211 of the two members 211 and 212, and the gas layer is the opening portion AP. With this arrangement, the interface between the gas layer and the light guide plate main body 210-1 or 210-2 can be reliably present. On the other hand, if an opening portion to be a gas layer is provided in at least one of the two members 211 and 212, when the two members 211 and 212 are joined by an adhesive, the adhesive may enter the opening portion, and the interface between the gas layer and the light guide plate main body 210-1 or 210-2 may no longer exist.

The light guide plate main body 210-1 or 210-2 and the adhesive layer 215 or 216 have translucency. With this arrangement, it becomes more effective that the reflection surface RS is inconspicuous.

The two members 211 and 212 are the first and second members 211 and 212 joined to each other in the thickness direction of the light guide plate main body 210-1 or 210-2, the light guide plate LGP is disposed in such a manner that the first member 211 faces the eyeball EB in the thickness direction of the light guide plate main body 210-1 or 210-2, and one member whose interface with the gas layer forms the reflection surface RS is the first member 211. With this arrangement, among the interfaces between the light guide plate main body 210-1 or 210-2 and the gas layer, the interface facing the eyeball EB side can be used as the reflection surface RS.

The first member 211 has the first fitting portion 211*a* on the joint surface with the second member 212, the second member 212 has the second fitting portion 212*a* substantially fitted with the first fitting portion 211*a* on the joint surface with the first member 211, at least the first fitting portion 211*a* of the first and second fitting portions 211*a* and 212*a* faces the gas layer, and the reflection surface RS is the interface between the first fitting portion 211*a* and the gas layer. With this arrangement, it is possible to reliably form the reflection surface RS while reliably joining the first and second members 211 and 212.

There is a plurality of gas layers, one of the first and second fitting portions 211*a* and 212*a* has a protrusion group including, as a plurality of constituent portions, a plurality of protrusions corresponding to the plurality of gas layers, the other of the first and second fitting portions 211*a* and 212*a* has a recess group including, as a plurality of constituent portions, a plurality of recesses that corresponds to the plurality of gas layers and into which the plurality of protrusions is inserted respectively, each of the constituent portions of the group included in at least the first fitting portion 211*a* of the protrusion group and the recess group faces the corresponding gas layer of the plurality of gas layers, and an interface between each of the constituent portions of the group included in the first fitting portion 211 and the corresponding gas layer is the reflection surface RS. With this arrangement, the plurality of reflection surfaces RS can be efficiently formed.

Each of the constituent portions of the group included in the first fitting portion 211*a* has a surface facing the corresponding gas layer. With this arrangement, the interface between the surface and the gas layer can be used as the reflection surface RS.

In a case where a part of the surface facing the gas layer described above faces the gas layer as in the light guide plate main body 210-1, it is possible to suppress a decrease in joint strength of the first and second fitting portions 211*a* and 212*a*.

In a case where the entire region of the surface facing the gas layer described above faces the gas layer as in the light guide plate main body 210-2, the reflection surface RS can be made large.

The light guide plate LGP further includes an optical surface group including a plurality of optical surfaces that guides a light beam included in the image light from the light projection system 100-1 to the reflection surface, and the reflection surface RS reflects the light beam via the optical surface group toward the eyeball EB. With this arrangement, the light beam incident on the eyeball EB can be incident at an appropriate incident angle with respect to the reflection surface RS that determines the angle of view of the light beam.

The optical surface group includes the light incident surface 210*a* that is one end surface of the light guide plate main body 210 and on which the light beam included in the image light is incident, and the total reflection surface 210*b* that is one side surface in the thickness direction of the light guide plate main body 210 and totally reflects the light beam via the light incident surface 210a. With this arrangement, the light beam can be more reliably guided to the reflection surface RS.

The total reflection surface 210b totally reflects a light beam included in the image light via the light incident surface 210a toward the reflection surface RS. With this arrangement, the number of optical surfaces of the optical surface group can be minimized, so that the optical design of the light guide plate main body 210-1 or 210-2 can be simplified, and a decrease in light use efficiency can be suppressed.

The light guide plate main body 210-3 includes a single member, and the gas layer is a through hole or a hole provided in the light guide plate main body 210-3. With this arrangement, it is not necessary to join the plurality of members with an adhesive when manufacturing the light guide plate LGP3.

The through hole or the hole described above is provided in an end surface of the light guide plate main body 210-3. With this arrangement, a long through hole or a deep hole extending in the in-plane direction of the light guide plate main body 210-3 can be formed.

A cross section of the through hole or the hole described above parallel to the end surface of the light guide plate main body 210-3 is inclined with respect to a thickness direction of the light guide plate main body 210-3. With this arrangement, the reflection surface RS inclined with respect to the thickness direction of the light guide plate main body 210-3 can be formed.

The image light includes a plurality of light beams forming different angles of view, a plurality of the reflection surfaces RS is provided corresponding to the plurality of light beams, and the plurality of the reflection surfaces RS reflects the plurality of corresponding light beams (for example, L1 to L5) incident on the eyeball EB at different angles of view. With this arrangement, an image with a wide angle of view and high definition can be displayed.

The plurality of the reflection surfaces RS is arranged in a direction intersecting (for example, orthogonal to) a thickness direction of the light guide plate main body 210. With this arrangement, the plurality of reflection surfaces RS can be efficiently laid out.

Each of the plurality of the reflection surfaces RS is an inclined surface inclined with respect to the thickness direction of the light guide plate main body 210. With this arrangement, the usability of the plurality of optical surfaces other than the reflection surfaces RS in the light guide plate main body 210 can be improved.

The plurality of inclined surfaces is parallel to each other. With this arrangement, reflection efficiency of vignetting or the like can be made even on the plurality of reflection surfaces RS, variation in light use efficiency between the reflection surfaces RS can be suppressed, and variation in luminance of light beams for each angle of view of image light can be eventually suppressed.

The gas layer described above is an air layer. With this arrangement, the difference in refractive index between the gas layer and the light guide plate main body 210 can be sufficiently increased, and the degree of freedom in setting the posture (reflection angle) of the reflection surface RS functioning as the total reflection surface can be improved.

A method of manufacturing the light guide plate LGP1 or LGP2 having the reflection surface RS inside of the image display device according to Example 1 or 2 of the first embodiment, in which the reflection surface RS is formed between the two members 211 and 212 (first and second members 211 and 212) joined to each other, includes a step of forming the adhesive layer AL by applying an adhesive to a joint surface of one member (second member 212) of the two members 211 and 212 with the other member (first member 211), a step of pressing the pressing surface 1000a, which is provided with the protrusion P protruding toward a position corresponding to a position where the reflection surface RS is formed on the joint surface of the one member (second member 212), against the adhesive layer AF to insert the protrusion P into the adhesive layer AF, a step of separating the pressing surface 1000a from the adhesive layer AL to form the opening portion AP at a position of the adhesive layer AL where the reflection surface RS is formed, a step of curing a portion around the position of the adhesive layer AL where the reflection surface RS is formed, a step of separating the pressing surface 1000a from the adhesive layer AL to form the opening portion AP in the adhesive layer AL, a step of bringing a portion other than the position where the reflection surface RS is formed of a joint surface of the other member (first member 211) with the one member (second member 212) into close contact with the adhesive layer 215 or 216, and a step of curing an entire region of the adhesive layer 215 or 216.

With this arrangement, the portion of the adhesive layer 215 or 216 around the reflection surface forming position can be cured in advance to reliably form the opening portion AP to be a gas phase in the adhesive layer, and the interface between the gas layer and the first member 211 can be sufficiently present, so that the reflection surface RS can be efficiently and reliably formed.

Note that, if the two members 211 and 212 are joined with an adhesive without previously curing the peripheral portion of the reflection surface forming position of the adhesive layer, the adhesive may enter the reflection surface forming position and the opening portion AP to be a gas layer cannot be formed, or even if the opening portion can be formed, the interface between the first member 211 and the opening portion AP may disappear or become significantly small, and there is a possibility that the reflection surface RS cannot be substantially formed.

Here, if light is reflected at the interface between the adhesive layer and the first member 211, wavefront aberration is added to the reflected light, so that resolving power decreases. For this reason, it is preferable that the adhesive does not adhere even slightly to the reflection surface forming position of the joint surface of the first member 211.

A method of manufacturing the light guide plate LGP3 having the reflection surface RS inside the light guide plate main body 210-3 of the image display device according to Example 3 of the first embodiment includes a step of producing the light guide plate base material BM integrated with the light guide plate main body 210-3 in such a manner that the plate-shaped mold member PSM penetrates at least one of a pair of end surfaces facing each other of the light guide plate main body 210-3, and a step of pulling out the plate-shaped mold member PSM from the light guide plate base material BM to form a through hole or a hole in the light guide plate main body 210-3.

With this arrangement, the reflection surface RS can be efficiently formed inside the light guide plate main body 210-3 formed by a single member.

7. Image Display Device According to Example 1 of Second Embodiment of Present Technology Hereinafter, an image display device 20-1 according to Example 1 of the second embodiment will be described with reference to FIG. 26.

Figure 26:
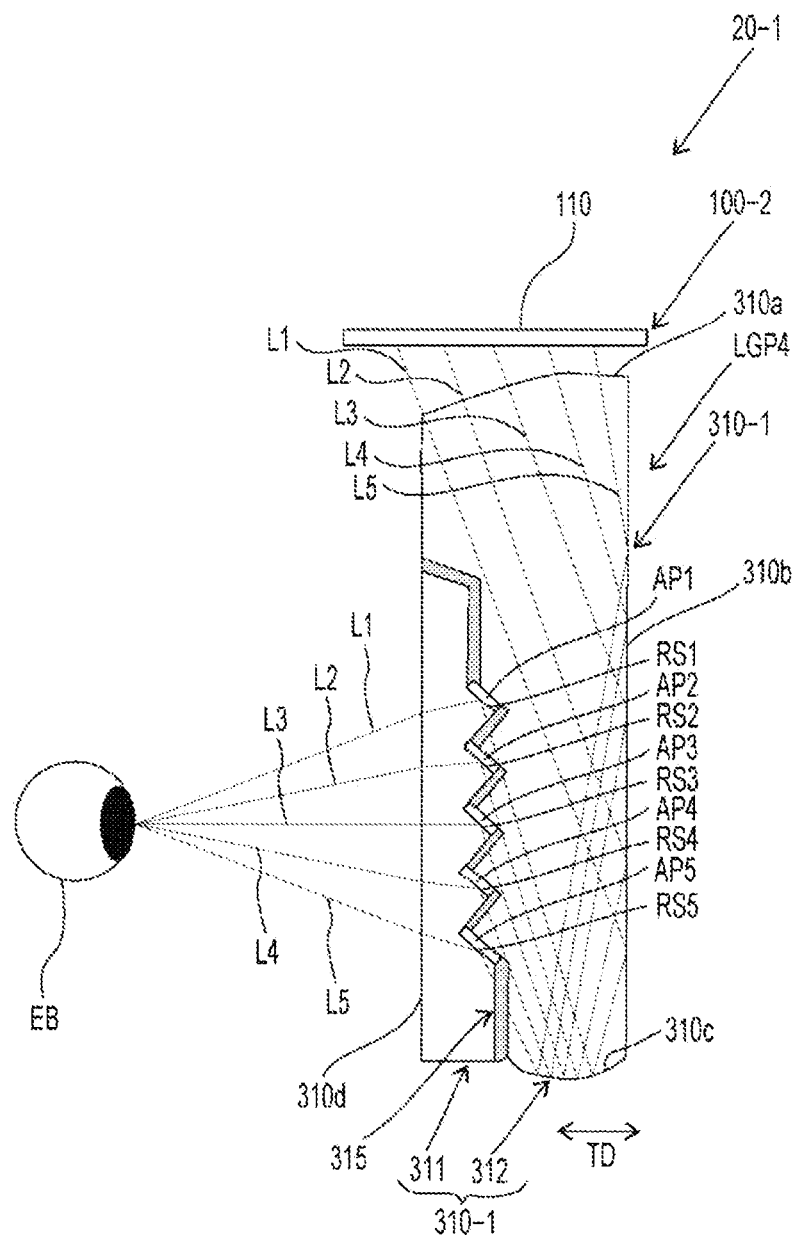
FIG. 26 is a diagram schematically illustrating a configuration of the image display device according to Example 1 of a second embodiment of the present technology.

As illustrated in FIG. 26, the image display device 20-1 includes a light projection system 100-2 and a light guide plate LGP4.

The light projection system 100-2 includes an image forming unit 110.

The light guide plate LGP4 includes a light guide plate main body 310-1 and the reflection surface RS (for example, RS1 to RS5) provided in the light guide plate main body 310-1.

The light guide plate LGP4 includes first and second members 311 and 312 and an adhesive layer 315 that joins the first and second members 311 and 312. The first and second members 311 and 312 are produced, for example, by injection molding using resin or the like as a material or by cutting glass.

The first and second members 311 and 312 have, on their joint surfaces, fitting portions that are substantially fitted with each other, similar to those of the first and second members 211 and 212 illustrated in FIG. 2.

Opening portions AP (AP1 to AP5) to be a gas layer similar to the adhesive layer 216 illustrated in FIG. 13 are formed in the adhesive layer 315. An interface between the opening portion AP and the first member 311 is the reflection surface RS (for example, RS1 to RS5).

The light guide plate LGP4 further includes an optical surface group including a plurality of optical surfaces that guides light beams (for example, each light beam of the light beams L1 to L5) included in the image light from the light projection system 100-2 to the reflection surface RS, and the reflection surface RS reflects the light beams via the optical surface group toward the eyeball EB.

The optical surface group described above includes a light incident surface 310a that is one end surface of the light guide plate main body 310-1 and on which the image light is incident, and a total reflection surface 310b that is one side surface in a thickness direction of the light guide plate main body 310-1 and that totally reflects the light beam included in the image light via the light incident surface 310a. As an example, the light incident surface 310a is a curved surface that is convex toward the incident side. The total reflection surface 310b totally reflects the light beam included in the image light via the light incident surface 310a toward the reflection surface RS. The light beam reflected by the reflection surface RS is incident on the eyeball EB via the light emission surface 310d that is the other side surface in the thickness direction TD of the light guide plate main body 310-1.

The optical surface group described above includes a concave mirror 310c that is provided on an end surface of the second member 312 facing the light incident surface 310a and reflects a light beam included in image light via the total reflection surface 310b toward the reflection surface RS. The concave mirror 310c has a light condensing function. More specifically, an end surface of the second member 312 facing the light incident surface 310a is formed as a concave surface as viewed from the light incident surface 310a, and a metal film (for example, an aluminum coating film) is formed on the concave surface to form the concave mirror 310c.

Note that, in a case where the end surface of the second member 312 facing the light incident surface 310a can be formed as a concave surface that can satisfy a total reflection condition, the interface between the concave surface and the air layer may function as a reflection surface and a light collecting surface.

As the curved surface of the light incident surface 310a and the concave mirror 310c, for example, a spherical surface, an aspherical surface, a toroidal surface, an anamorphic aspherical surface, a free-form surface, or the like can be employed.

Note that the light incident surface 310a may be a flat surface.

Figure 27:
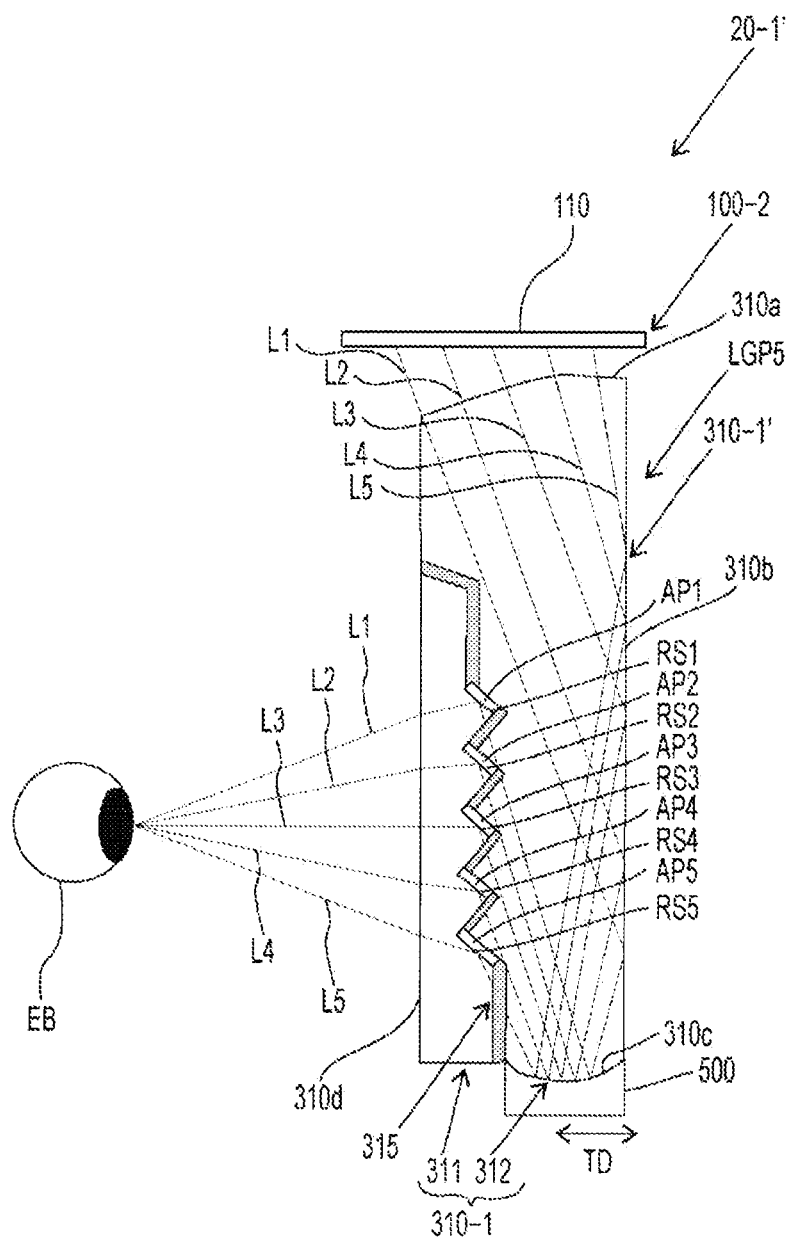
FIG. 27 is a diagram schematically illustrating a configuration of the image display device according to a modification of Example 1 of the second embodiment of the present technology.

Note that, as in the image display device 20-1' according to the modification of Example 1 of the second embodiment illustrated in FIG. 27, a light guide plate main body 310-1' of a light guide plate LGP5 may have a protective member 500 joined to the concave mirror 310c. With this arrangement, the concave mirror 310c can be protected from an external impact or the like, and deformation, damage, or the like of the concave mirror 310c can be suppressed.

8. Image Display Device According to Example 2 of Second Embodiment of Present Technology Hereinafter, an image display device 20-2 according to Example 2 of the second embodiment will be described with reference to FIG. 28.

Meanwhile, in the image display device 20-1 according to Example 1, the light incident surface 310a, the total reflection surface 310b, and the concave mirror 310c are formed on the second member 312. However, in order to manufacture such three optical surfaces by injection molding, it is difficult to ensure the shape accuracy of the optical surfaces, and it is costly.

Accordingly, in the image display device 20-2 according to Example 2, a function of a concave mirror is imparted by a member different from the second member.

Figure 28:
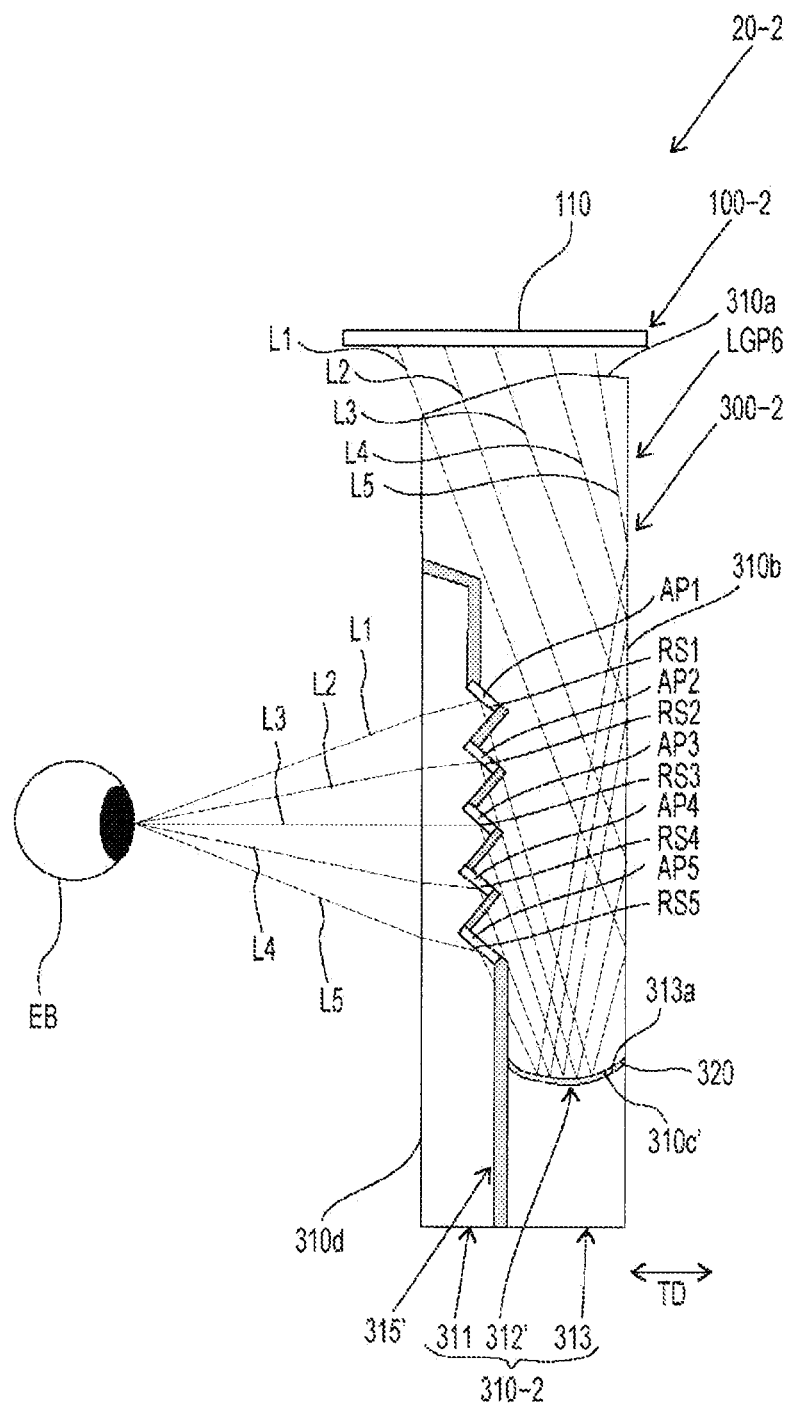
FIG. 28 is a diagram schematically illustrating a configuration of an image display device according to Example 2 of the second embodiment of the present technology.

In the image display device 20-2, as illustrated in FIG. 28, a light guide plate main body 300-2 of a light guide plate LGP6 includes a third member 313 having a concave mirror 313a that reflects the light beam included in the image light via the total reflection surface 310b toward reflection surface RS. The concave mirror 313a is joined to an end surface 310c' of a second member 312' facing the light incident surface 310a. The end surface 310c' has a shape following the concave surface of the concave mirror 313a, and is joined to the concave mirror 313a via an adhesive layer 320 having a refractive index substantially the same as that of the second member 312'. Therefore, refraction of light hardly occurs between the second member 312' and the adhesive layer 320. That is, refraction of light beams at the time of incidence on the concave mirror 313a and at the time of reflection from the concave mirror 313a is suppressed, and deterioration of optical characteristics is eventually suppressed.

As described above, in the image display device 20-2, since the optical function of the light guide plate main body 300-2 is shared by the three members (first to third members 311, 312', and 313), the accuracy of each member can be improved, and the resolving power can be improved.

The light guide plates LGP4, LGP5, and LGP6 of the image display devices according to Example 1, the modifications thereof, and Example 2 of the second embodiment described above can also be manufactured by a manufacturing method similar to that of the light guide plates LGP1 and LGP2 of the image display devices according to Examples 1 and 2 of the first embodiment.

Figure 29:
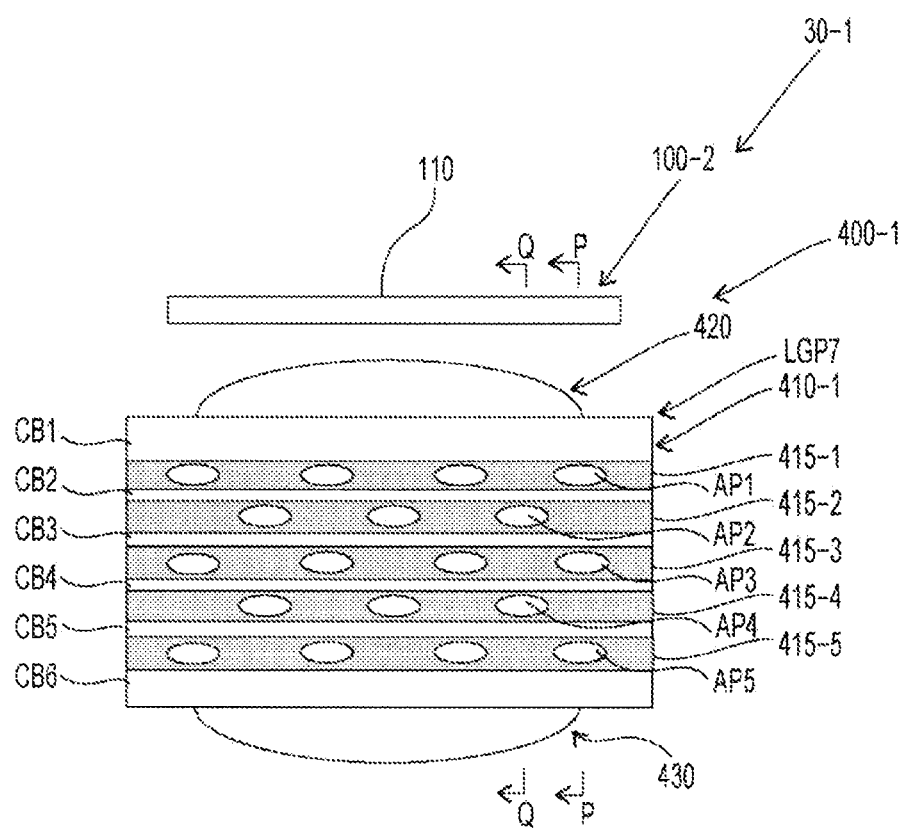
FIG. 29 is a diagram schematically illustrating a configuration of an image display device according to Example 1 of a third embodiment of the present technology.
Figure 30A:
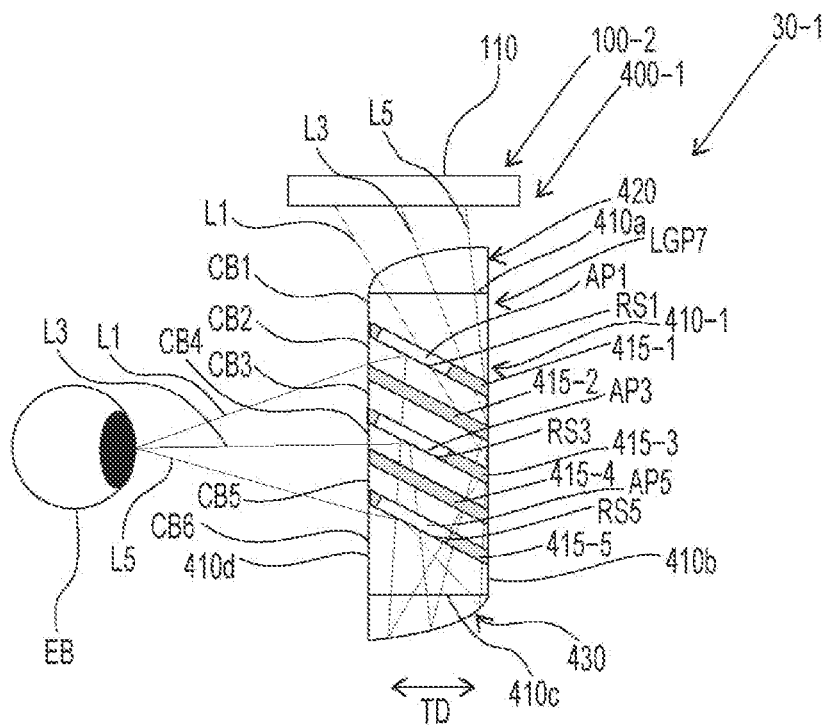
FIG. 30A is a cross-sectional view taken along line P-P in FIG. 29.
Figure 30B:
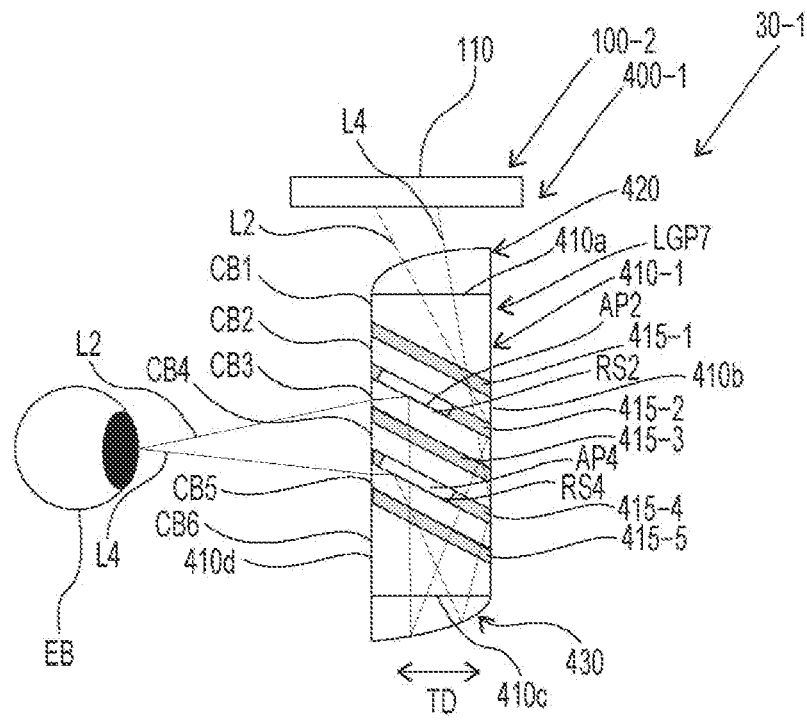
FIG. 30B is a cross-sectional view taken along line Q-Q in FIG. 29.

9. Image Display Device According to Example 1 of Third Embodiment of Present Technology Configuration of Image Display Device According to Example 1 of Third Embodiment of Present Technology Hereinafter, an image display device 30-1 according to Example 1 of a third embodiment will be described with reference to FIGS. 29, 30A, and 30B. FIG. 29 is a side perspective view of the image display device 30-1. FIG. 30A is a cross-sectional view taken along line P-P in FIG. 29. FIG. 30B is a cross-sectional view taken along line Q-Q in FIG. 29.

As illustrated in FIGS. 29, 30A, and 30B, the image display device 30-1 includes a light projection system 100-2 and a light guide system 400-1.

The light projection system 100-2 includes an image forming unit 110.

The light guide system 400-1 includes a lens 420 joined to a light incident surface 410a that is one end surface of a light guide plate main body 410-1 of the light guide plate LGP 7 and a concave mirror 430 joined to the other end surface 410c of the light guide plate main body 410-1 and reflecting light beams included in the incident image light toward the reflection surface RS (for example, RS1 to RS5). One side surface in the thickness direction of the light guide plate main body 410-1 is a total reflection surface 410b that totally reflects the light beams included in the image light via the lens 420 and the light incident surface 410a toward the concave mirror 430. The concave mirror 430 reflects the incident light beams while condensing the light beam toward the reflection surface RS. The light beams reflected by the reflection surface RS is incident on the eyeball EB via a light emission surface 410d that is the other side surface in the thickness direction of the light guide plate main body 410-1.

The light guide plate main body 410-1 includes a plurality of stacked constituent members CB (for example, CB1 to CB6). The plurality of constituent members CB is stacked in a direction inclined with respect to the thickness direction of the light guide plate main body 410-1. As an example, each of the constituent members CB is a flat plate member made by glass or resin.

The constituent member CB1 and the constituent member CB2 are joined with an adhesive layer 415-1 interposed therebetween. In the adhesive layer 415-1, an opening portion AP1 opened to the constituent member CB1 side and the constituent member CB2 side is formed.

The constituent member CB2 and the constituent member CB3 are joined with an adhesive layer 415-2 interposed therebetween. In the adhesive layer 415-2, an opening portion AP2 opened to the constituent member CB2 side and the constituent member CB3 side is formed.

The constituent member CB3 and the constituent member CB4 are joined with an adhesive layer 415-3 interposed therebetween. In the adhesive layer 415-3, an opening portion AP3 opened to the constituent member CB3 side and the constituent member CB4 side is formed.

The constituent member CB4 and the constituent member CB5 are joined with an adhesive layer 415-4 interposed therebetween. In the adhesive layer 415-4, an opening portion AP4 opened to the constituent member CB4 side and the constituent member CB5 side is formed.

The constituent member CB5 and the constituent member CB6 are joined with an adhesive layer 415-5 interposed therebetween. In the adhesive layer 415-5, an opening portion AP5 opened to the constituent member CB5 side and the constituent member CB6 side is formed.

Here, the image light is incident from the light incident surface 410a into the light guide plate main body 410-1. An interface between the constituent member CB far from the light incident surface 410a among the two constituent members CB joined to each other and the opening portion AP that is a gas layer is the reflection surface RS.

More specifically, the interface between the constituent member CB2 and the opening portion AP1 is the reflection surface RS1 (see FIG. 30A). An interface between the constituent member CB3 and the opening portion AP2 is the reflection surface RS2 (see FIG. 30B). An interface between the constituent member CB4 and the opening portion AP3 is the reflection surface RS3 (see FIG. 30A). An interface between the constituent member CB5 and the opening portion AP4 is the reflection surface RS4 (see FIG. 30B). An interface between the constituent member CB6 and the opening portion AP5 is the reflection surface RS5 (see FIG. 30A).

The reflection surfaces RS1 to RS5 are provided corresponding to the light beams L1 to L5 included in the image light, respectively.

It is preferable that the flatness is as high as possible on one side surface and the other side surface in the thickness direction of each constituent member CB. With this arrangement, flatness of each of the reflection surfaces RS and parallelism between the reflection surfaces RS can be increased as much as possible.

As can be seen from FIGS. 29, 30A, and 30B, the plurality of opening portions AP is arranged in a zigzag shape as a whole when viewed from the side surface side of the light guide plate main body 410-1.

More specifically, the opening portions AP1, AP3, and AP5 are arranged in a direction orthogonal to the thickness direction of the light guide plate main body 410-1, and the opening portions AP2 and AP4 are arranged in the direction orthogonal to the thickness direction of the light guide plate main body 410-1.

In this manner, by arranging the opening portions AP and the reflection surfaces RS to be laterally shifted every other adhesive layer, each light beam reflected by the concave mirror 430 can be guided to the corresponding reflection surface RS through a path not incident on the non-corresponding reflection surface RS.

As the reflection angle of the light beam on the reflection surface RS increases, the inclination angles of the reflection surface RS with respect to the total reflection surface 410b and the light emission surface 410d decrease, and the transmitted light is easily transmitted through a light guide plate LGP7, so that the image of the reflection surface RS becomes more inconspicuous.

Method of Manufacturing Light Guide Plate of Image Display Device According to Example 1 of Third Embodiment of Present Technology Hereinafter, a method of manufacturing the light guide plate LGP7 of the image display device according to Example 1 of the third embodiment of the present technology will be described with reference to a flowchart of FIG. 31 and FIG. 32. The method of manufacturing the light guide plate LGP7 is performed by repeating the method of manufacturing the light guide plates LGP1 and LGP2 illustrated in the flowchart of FIG. 3 a plurality of times. Therefore, a method of manufacturing the light guide plate LGP7 will be briefly described.

In the first step S31, n is set to 1.

In the next step S32, an adhesive is applied to the entire region of the joint surface of the n-th constituent member CBn to form an adhesive layer.

In the next step S33, the pressing surface 1000a of the pressing member 1000 having the protrusion P for forming the opening portion AP at the reflection surface forming position of the adhesive layer is pressed.

In the next step S34, the adhesive around the reflection surface forming position of the adhesive layer is cured.

In the next step S35, the pressing surface 1000*a* of the pressing member 1000 is separated from the adhesive layer. Consequently, the n-th adhesive layer 415-*n* having the opening portion AP is formed.

In the next step S36, the joint surface of the (n+1)-th constituent member CBn+1 is brought into close contact with the n-th adhesive layer 415-*n*.

In the next step S37, the entire region of the n-th adhesive layer 415-*n* is cured.

In the next step S38, it is determined whether or not n<N (for example, 6) is satisfied. When the determination here is positive, the process proceeds to step S39, and when the determination is negative, the process proceeds to step S40.

In step S39, n is incremented. When step S39 is executed, the process returns to step S32.

Figure 32:
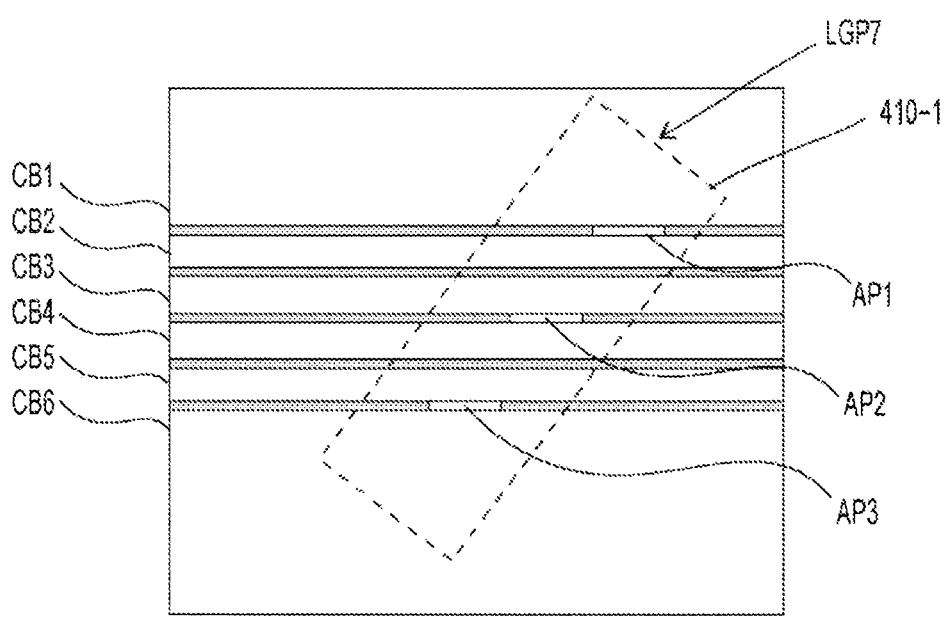
FIG. 32 is a view for explaining the method of manufacturing the light guide plate in FIG. 29.

In the final step S40, as illustrated in FIG. 32, the light guide plate LGP7 is cut out from a stacked body in which the first to N-th constituent members are stacked such that the reflection surface RS is inclined at a desired angle with respect to the thickness direction of the light guide plate main body 410-1, and then a surface is polished.

10. Image Display Device According to Example 2 of Third Embodiment of Present Technology Hereinafter, an image display device 30-2 according to Example 2 of the third embodiment of the present technology will be described with reference to FIGS. 33A and 33B.

Figure 33A:
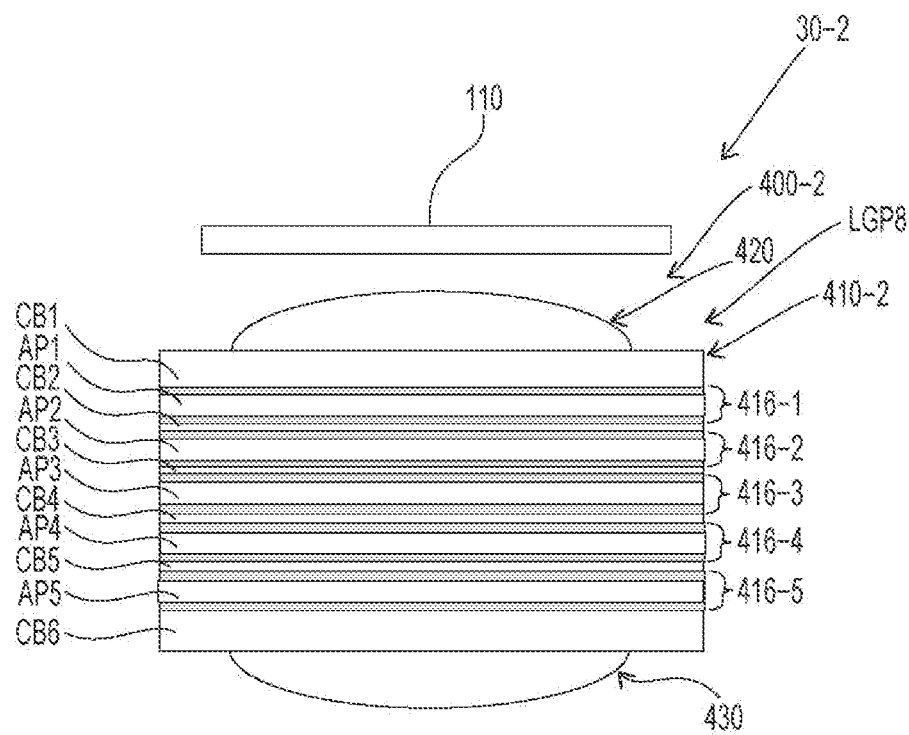
FIG. 33A is a diagram schematically illustrating a configuration of an image display device according to Example 2 of the third embodiment of the present technology.
Figure 33B:
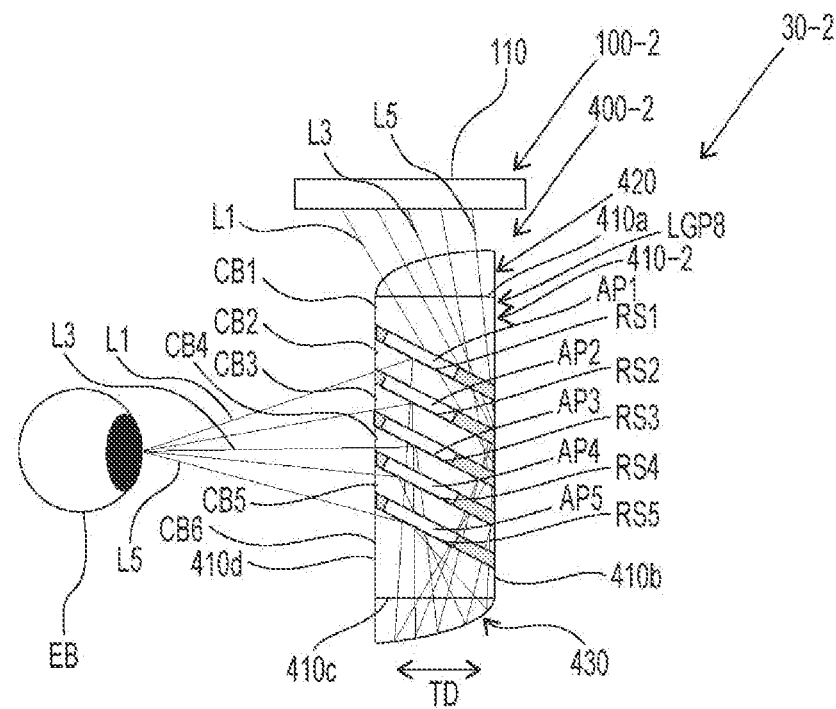
FIG. 33B is a longitudinal sectional view of FIG. 33A.

As illustrated in FIGS. 33A and 33B, the image display device 30-2 according to Example 2 has a similar configuration to that of the image display device 30-1 according to Example 1 except that the opening portion AP formed in adhesive layers 416 (for example, 416-1 to 416-5) of a light guide plate main body 410-2 of a light guide plate LGP8 in a light guide system 400-2 is an elongated through hole opened in end surfaces of the light guide plate LGP8 facing each other.

That is, in the light guide plate LGP8, the multiple stacked adhesive layers 416 are substantially the same.

In the light guide plate LGP8, a length of the opening portion AP formed in the adhesive layer 416 in a direction orthogonal to the stacking direction of the plurality of constituent members CB is relatively long, and the reflection surface RS (target on which the corresponding light beam is incident) is relatively large. With this arrangement, it is possible to improve the degree of freedom of optical design (for example, design of the shape of an upper optical surface of the reflection surface RS of the light guide plate LGP8, or the like) for guiding the light beam corresponding to the reflection surface RS in the light guide plate LGP8.

Figure 31:
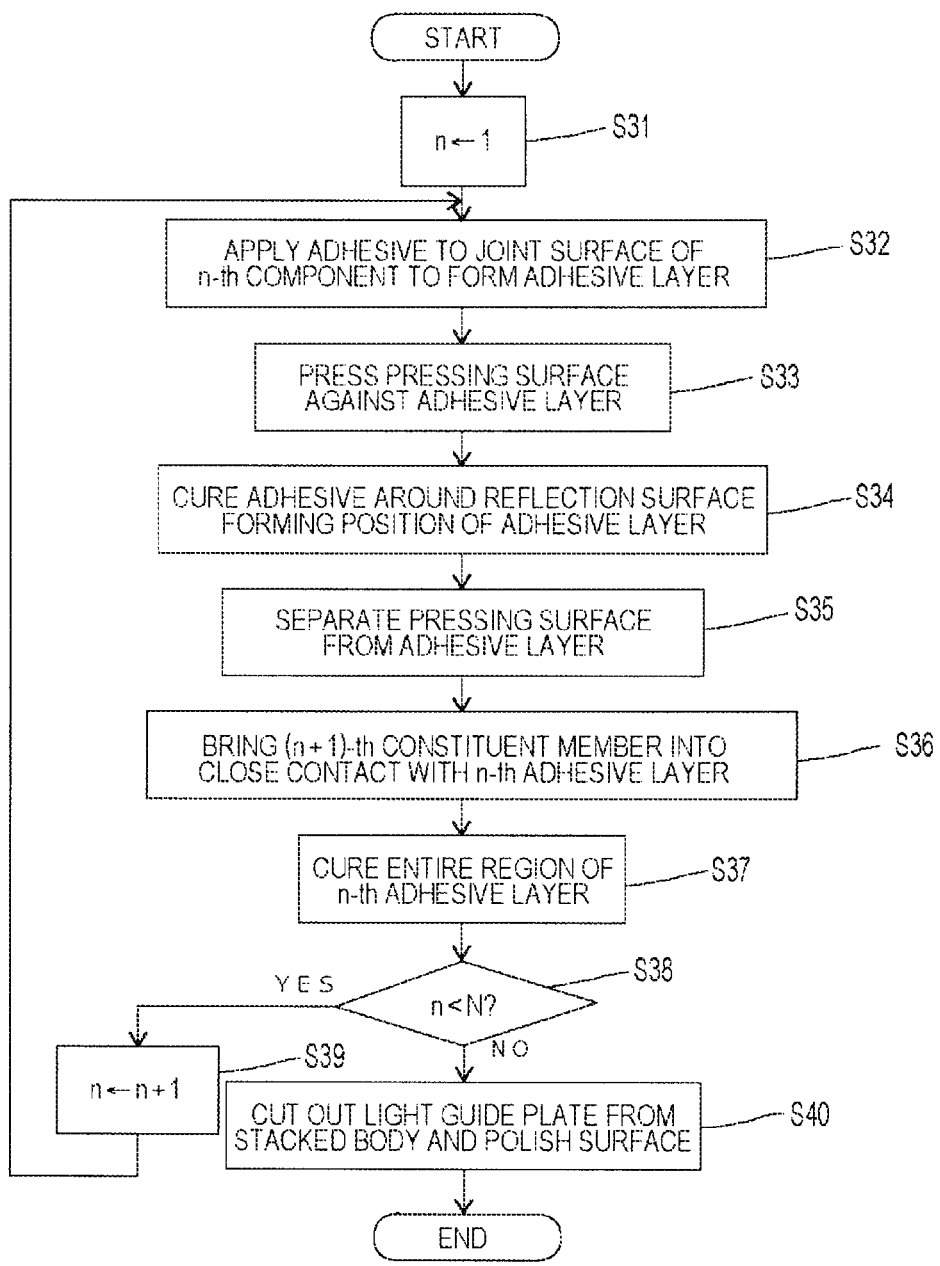
FIG. 31 is a flowchart for explaining a method of manufacturing a light guide plate in FIG. 29.

The light guide plate LGP8 can be manufactured by a method similar to the manufacturing method of the light guide plate LGP7 illustrated in the flowchart of FIG. 31. When the light guide plate LGP8 is manufactured, the constituent members CB are only required to be joined to each other with substantially the same adhesive layer 416, and thus the manufacturing is easy.

11. Image Display Device According to Example 3 of Third Embodiment of Present Technology Hereinafter, an image display device 30-3 according to Example 3 of the third embodiment of the present technology will be described with reference to FIGS. 34A and 34B.

Figure 34A:
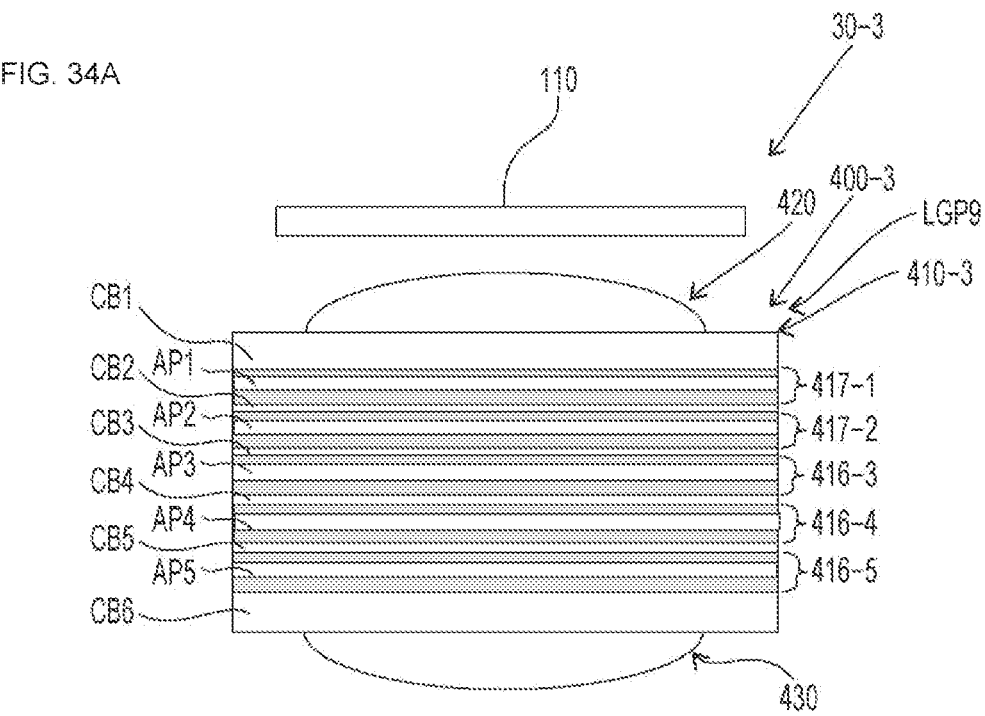
FIG. 34A is a diagram schematically illustrating a configuration of an image display device according to Example 3 of the third embodiment of the present technology.
Figure 34B:
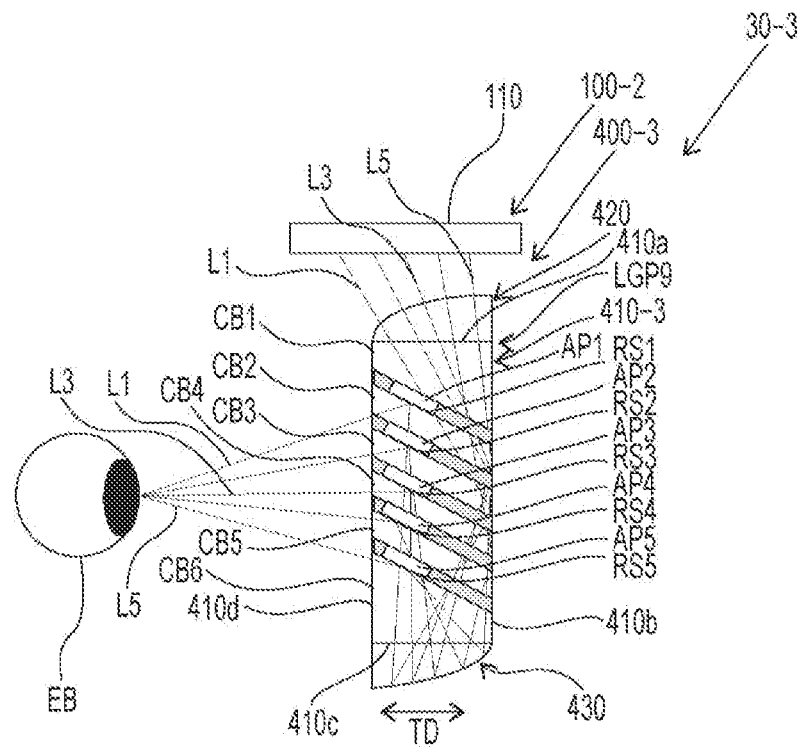
FIG. 34B is a longitudinal sectional view of FIG. 34A.

As illustrated in FIGS. 34A and 34B, the image display device 30-3 according to Example 3 has a similar configuration to that of the image display device 30-2 according to Example 2 except that a length of the opening portion AP formed in adhesive layers 417 (for example, 417-1 to 417-5) of a light guide plate main body 410-3 of a light guide plate LGP9 in a light guide system 400-3 in the direction orthogonal to the stacking direction of the plurality of constituent members CB is different.

Also in the light guide plate LGP9, the multiple stacked adhesive layers 417 are substantially the same.

In the light guide plate LGP9, the length of the opening portion AP formed in the adhesive layer 417 in the direction orthogonal to the stacking direction of the plurality of constituent members CB is relatively short, and the reflection surface RS (target on which the corresponding light beam is incident) is relatively small. With this arrangement, when performing optical design for guiding the light beam corresponding to the reflection surface RS in the light guide plate LGP9 (for example, design of the shape of an upper optical surface of the reflection surface RS of the light guide plate LGP9, or the like), the optical design is relatively easy because it is a condition that the light beam is relatively less likely to be incident on the non-corresponding reflection surface RS.

The light guide plate LGP9 can be manufactured by a method similar to the manufacturing method of the light guide plate LGP7 illustrated in the flowchart of FIG. 31. When the light guide plate LGP9 is manufactured, the constituent members CB are only required to be joined to each other with substantially the same adhesive layer 417, and thus the manufacturing is easy.

The light guide plate of the image display device of each example of the third embodiment described above can also be manufactured by patterning, by a printing process, the adhesive layer having the opening portion AP that joins the constituent members CB. However, in this case, the adhesive used for the adhesive layer preferably has high viscosity and low fluidity.

12. Modification of Present Technology

The image display device according to the present technology is not limited to the configuration described in each of the embodiments described above, and can be appropriately changed without departing from the gist thereof.

In each of the embodiments described above, the gas layer has been described as an example of the low refractive index layer, but the low refractive index layer may be a liquid layer (liquid phase) or a solid layer (solid phase).

As an example in which the low refractive index layer is a solid layer, the material of the light guide plate main body may be glass (for example, BK7), and the material of the low refractive index layer may be quartz.

As an example in which the low refractive index layer is a liquid layer, the material of the low refractive index layer may be water, oil, or the like.

As an example in which the low refractive index layer is a solid layer (for example, a resin layer), the material of the light guide plate main body may be ZEONEX K26R, K22R, F52R, and T62R (all registered trademark), and the material of the low refractive index layer may be ZEONEX 330R, 480R, and E48R (all registered trademark).

Here, as the difference in refractive index between the light guide plate main body and the low refractive index layer is larger, the reflection angle of the light beam on the reflection surface RS can be increased and the angle of view can be increased, and thus the materials of the light guide plate main body and the low refractive index layer may be selected according to a desired angle of view.

Figure 35:
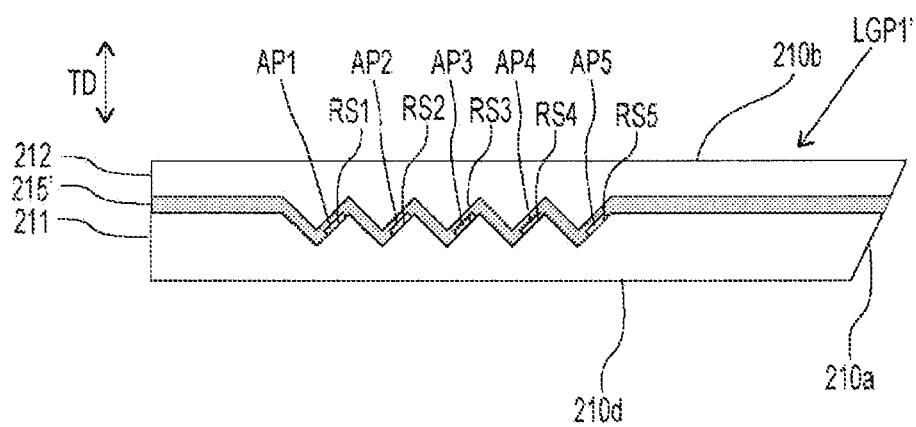
FIG. 35 is a cross-sectional view of a light guide plate of an image display device according to Modification 1 of Example 1 of the first embodiment of the present technology.

For example, as in a light guide plate LGP1' of an image display device according to Modification 1 of Example 1 of the first embodiment illustrated in FIG. 35, the opening portions AP (AP1 to AP5) formed in the adhesive layer 215' may be opened only on the first member 211 side. As described above, as long as the interface between the opening portion AP and the first member 211, which is to be the reflection surface RS (for example, RS1 to RS5), is sufficiently present, the interface between the opening portion AP and the second member 212 may not be present.

When the light guide plate LGP1' is manufactured, it is sufficient if only the portion corresponding to the reflection surface forming position of the adhesive layer 215' is thinned.

Figure 36:
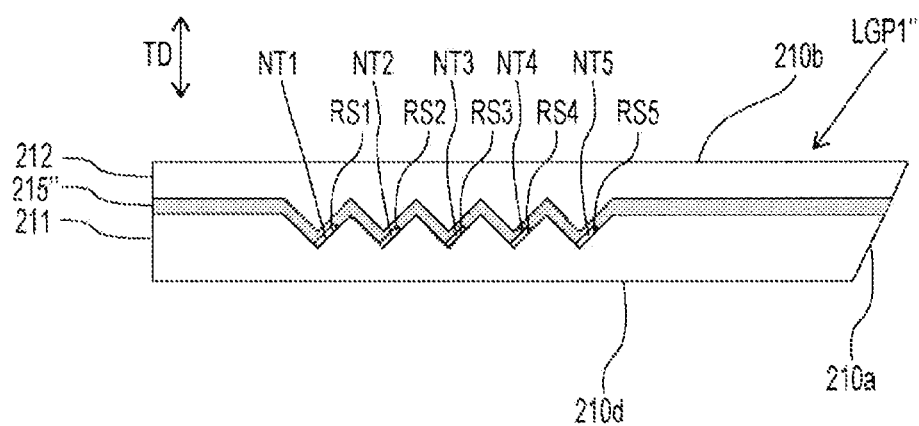
FIG. 36 is a cross-sectional view of a light guide plate of an image display device according to Modification 2 of Example 1 of the first embodiment of the present technology.

For example, as in a light guide plate LGP1" of an image display device according to Modification 2 of Example 1 of the first embodiment illustrated in FIG. 36, a cutout portion NT (for example, NT1 to NT5) opened only to the first member 211 side may be formed in the adhesive layer 215". Also in this case, the interface between the cutout portion NT and the first member 211 can be the reflection surface RS (for example, RS1 to RS5).

Figure 37:
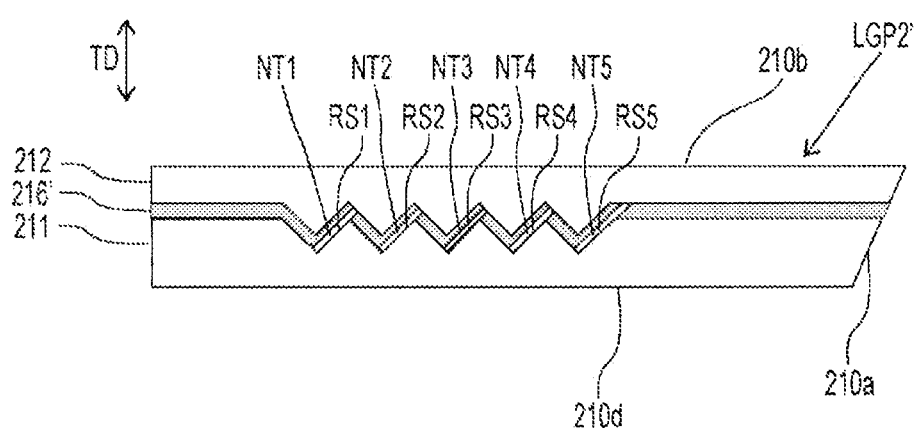
FIG. 37 is a cross-sectional view of a light guide plate of an image display device according to Modification 1 of Example 2 of the first embodiment of the present technology.

For example, as in a light guide plate LGP2' of an image display device according to Modification 1 of Example 2 of the first embodiment illustrated in FIG. 37, a cutout portion NT (for example, NT1 to NT5) opened to the first member 211 side and the second member 212 side may be formed in the adhesive layer 216'. Also in this case, the interface between the cutout portion NT and the first member 211 can be the reflection surface RS (for example, RS1 to RS5).

For example, an opening portion AP similar to that in FIG. 35, a cutout portion NT similar to that in FIG. 36, or a cutout portion NT similar to that in FIG. 37 may be formed in the adhesive layer of the light guide plate LGP4, 5, or 6 of the image display device according to Example 1, the modification, or Example 2 of the second embodiment.

For example, an opening portion AP similar to that in FIG. 35, a cutout portion NT similar to that in FIG. 36, or a cutout portion NT similar to that in FIG. 37 may be formed in the adhesive layer of the light guide plate LGP7, 8, or 9 of the image display device according to Examples 1 to 3 of the third embodiment.

Figure 38:
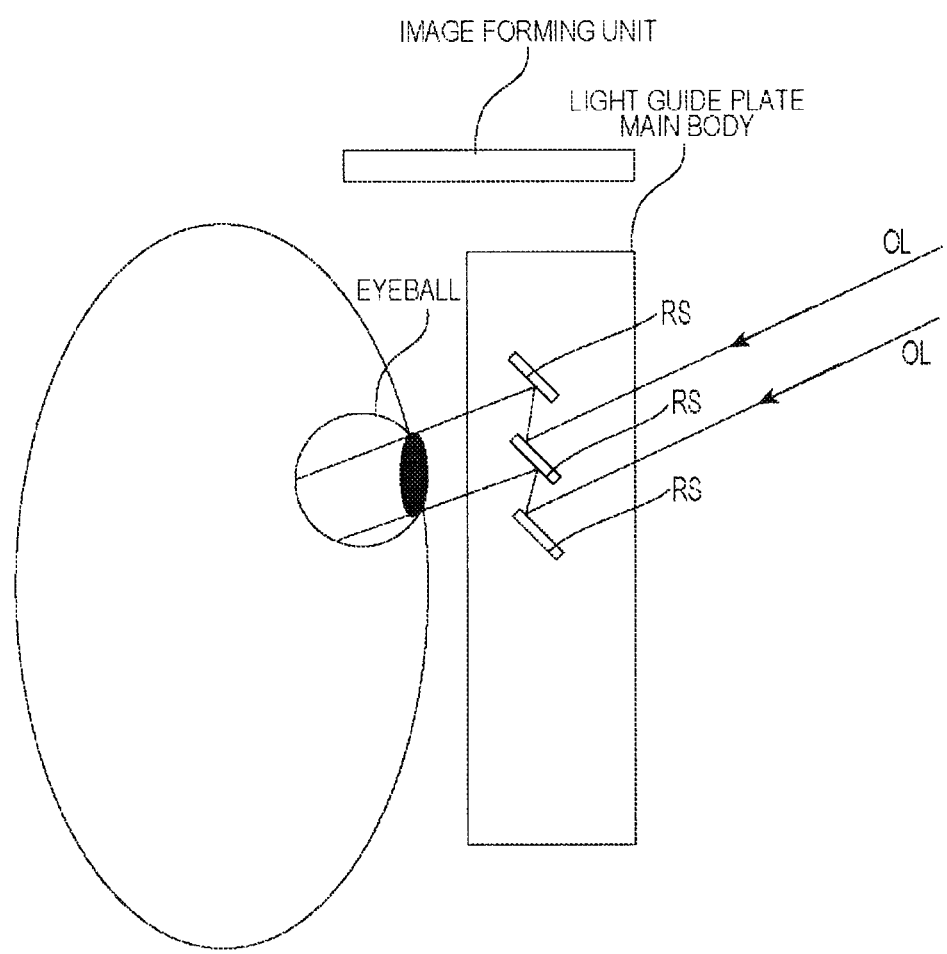
FIG. 38 is a diagram for explaining influence of a fact that an interface facing the reflection surface is a flat surface.

Meanwhile, as illustrated in FIG. 38, when the other interface facing the reflection surface RS, which is one interface of two of the interfaces facing each other between the light guide plate main body and the gas layer, is a flat surface, there is a possibility that external light incident on the light guide plate main body is regularly reflected by one reflection surface RS, and then regularly reflected by another adjacent reflection surface RS and incident on the eyeball. In particular, in a case where the external light is strong, the external light appears to overlap an image displayed on the eyeball as ghost or stray light, and thus visibility may be deteriorated.

Figure 39:
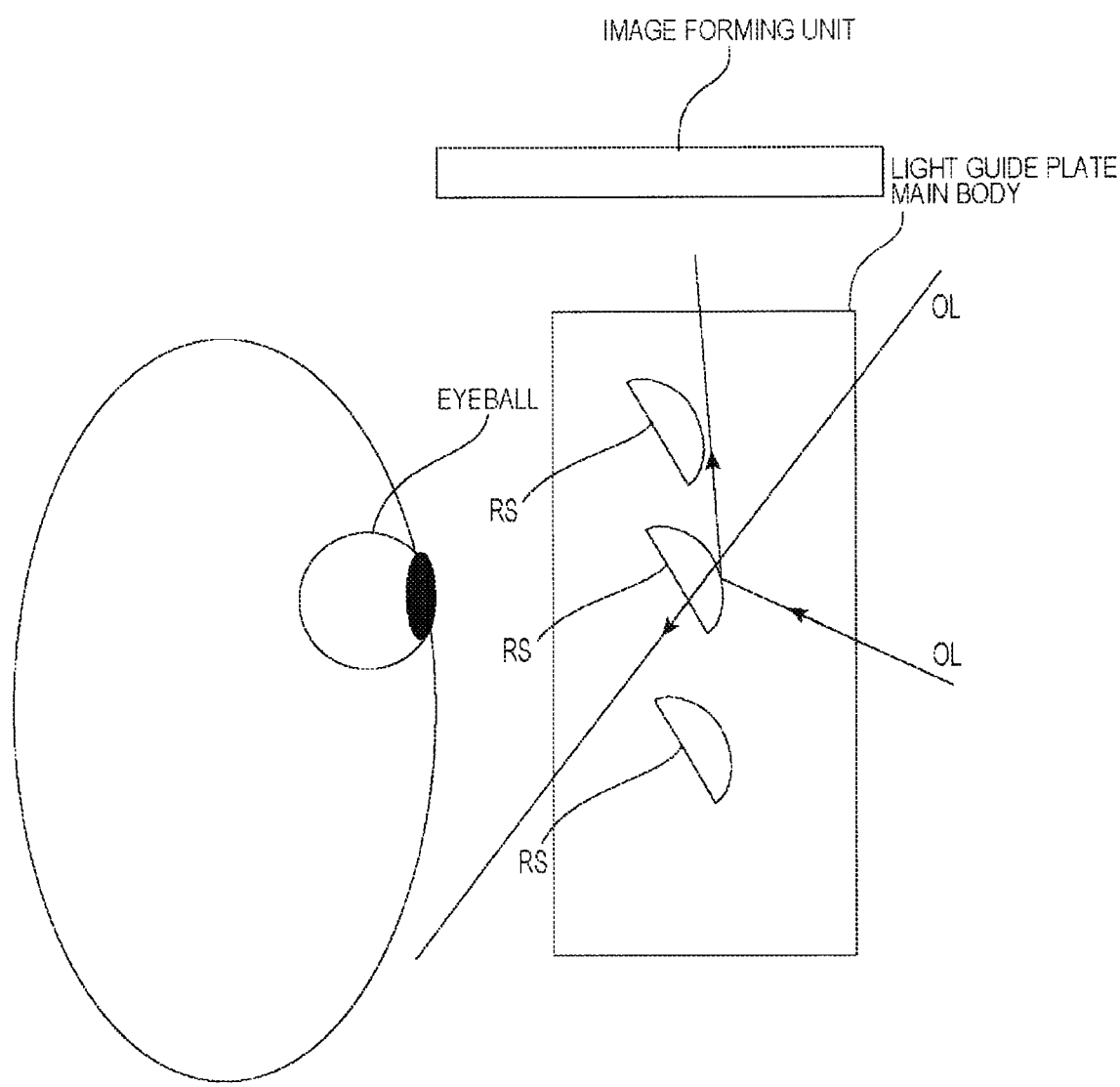
FIG. 39 is a diagram for explaining an operation and an effect in a case where the interface facing the reflection surface is a curved surface that is convex toward a light incident side.

Therefore, for example, as illustrated in FIG. 39, by forming the other interface described above (interface facing the reflection surface RS) into a curved surface that is convex toward the incident side of the external light, the external light satisfying the total reflection condition among the external light incident on the curved surface can be totally reflected (diverged) by the curved surface, and—the external light not satisfying the total reflection condition can be transmitted, and the external light can be prevented from being incident on the reflection surface RS and eventually on the eyeball EB. Consequently, it is possible to suppress deterioration in visibility due to ghost and stray light.

Furthermore, if the other interface described above (the interface facing the reflection surface RS) is a curved surface, even if external light reflected by the curved surface is incident on the eyeball, the distance to be in focus is changed by being reflected by the curved surface, and the light of the display image (the light beam included in the image light) is out of focus, so that it is also possible to suppress deterioration in visibility due to stray light.

Figure 40:
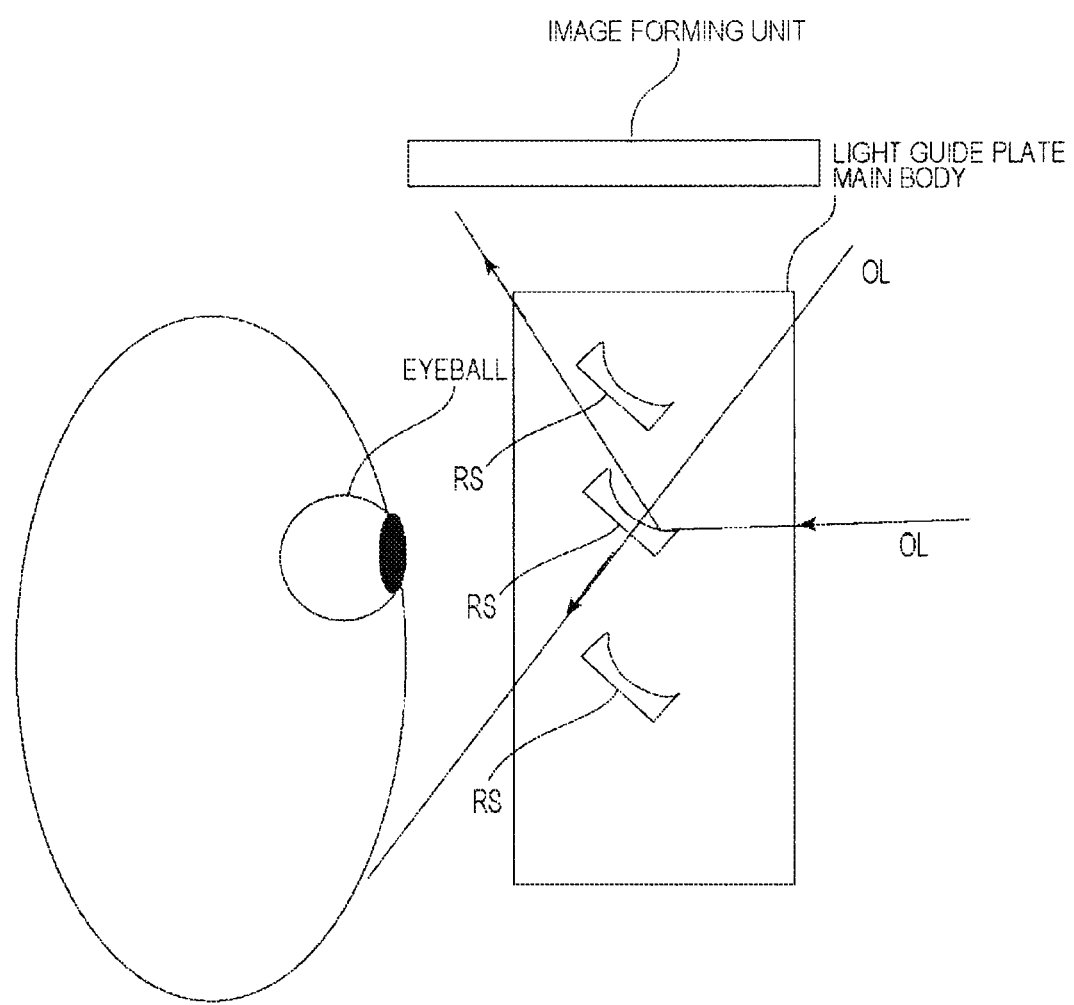
FIG. 40 is a diagram for explaining an operation and an effect in a case where the interface facing the reflection surface is a curved surface that is concave toward the light incident side.

For example, as illustrated in FIG. 40, by forming the other interface described above (the interface facing the reflection surface RS) into a curved surface that is concave toward the incident side of the external light, the external light satisfying the total reflection condition among the external light incident on the curved surface can be totally reflected (converged) by the curved surface, and the light not satisfying the total reflection condition can be transmitted, and the external light can be prevented from being incident on the reflection surface RS and eventually on the eyeball EB. Consequently, it is possible to suppress deterioration in visibility due to ghost and stray light.

Figure 41:
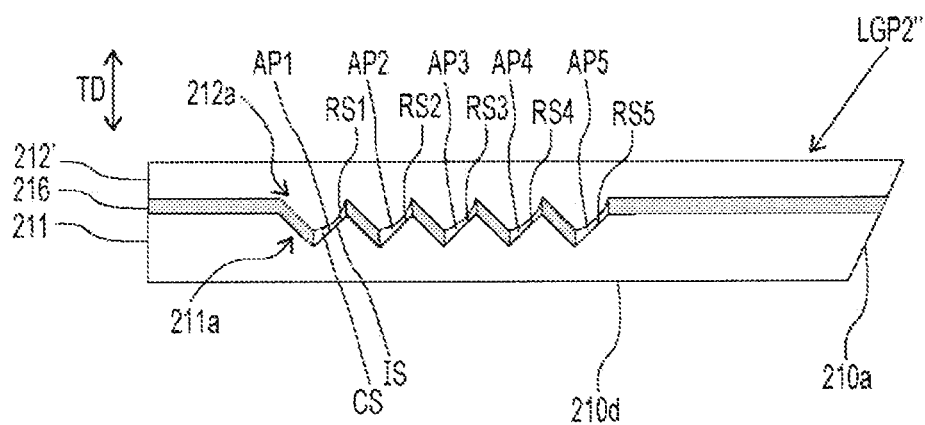
FIG. 41 is a cross-sectional view of a light guide plate of an image display device according to Modification 2 of Example 2 of the first embodiment of the present technology.

More specifically, for example, as in a light guide plate LGP2" of an image display device according to Modification 2 of Example 2 of the first embodiment illustrated in FIG. 41, the interface facing the reflection surface RS may be a curved surface that is concave toward the incident side of the external light.

Specifically, the surface of the second member 212' facing the opening portion AP (for example, AP1 to AP5) to be the gas layer may be a curved surface CS that is concave toward the incident side of the external light, and the interface facing the reflection surface RS (for example, RS1 to RS5), which is the interface between the opening portion AP and the second member 212', can be a curved surface that is concave toward the incident side of the external light.

Figure 42:
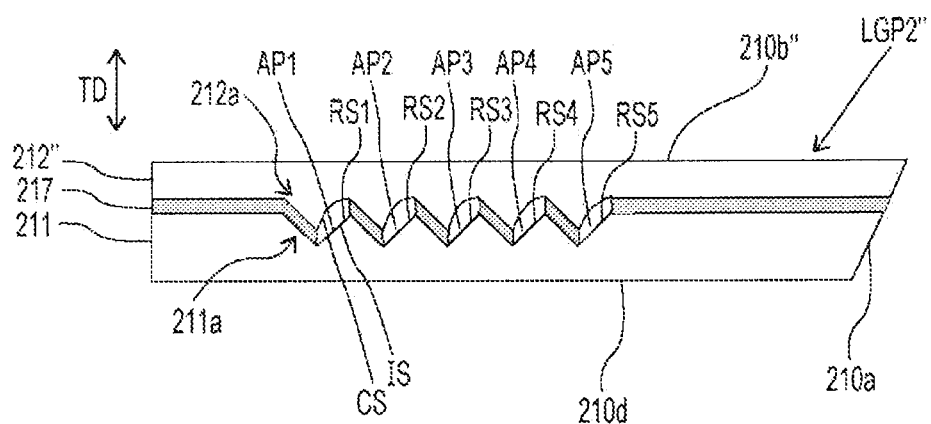
FIG. 42 is a cross-sectional view of a light guide plate of an image display device according to Modification 3 of Example 2 of the first embodiment of the present technology.

For example, as in a light guide plate LGP2''' of an image display device according to Modification 3 of Example 2 of the first embodiment illustrated in FIG. 42, the interface facing the reflection surface RS may be a curved surface that is convex toward the incident side of external light.

Specifically, the surface of the second member 212" facing the opening portion AP (for example, AP1 to AP5) to be the gas layer may be a curved surface CS that is convex toward the incident side of the external light, and the surface facing the reflection surface RS (for example, RS1 to RS5), which is the interface between the opening portion AP and the second member 212", can be a curved surface that is convex toward the incident side of the external light.

Figure 43:
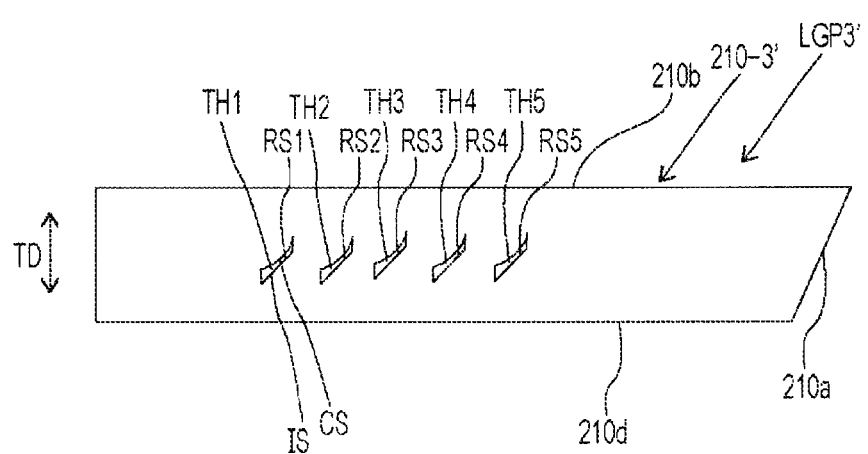
FIG. 43 is a cross-sectional view of a light guide plate of an image display device according to Modification 1 of Example 3 of the first embodiment of the present technology.

For example, as in a light guide plate LGP3' of an image display device according to Modification 1 of Example 3 of the first embodiment illustrated in FIG. 43, the interface facing the reflection surface RS (for example, RS1 to RS5) may be a curved surface that is concave toward the incident side of external light.

Specifically, the surface of the light guide plate main body 210-3' of the light guide plate LGP3' facing the through hole TH (for example, TH1 to TH5) to be the gas layer and facing the reflection surface RS (for example, RS1 to RS5) can be set as the curved surface CS that is concave toward the incident side of the external light, and the interface between the through hole TH and the light guide plate main body 210-3' facing the reflection surface RS (for example, RS1 to RS5) can be set as the curved surface CS that is concave toward the incident side of the external light.

Figure 44:
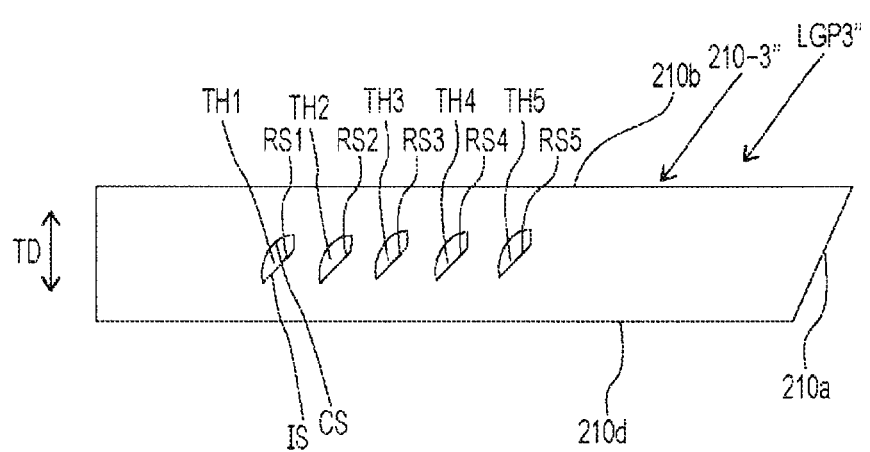
FIG. 44 is a cross-sectional view of a light guide plate of an image display device according to Modification 2 of Example 3 of the first embodiment of the present technology.

For example, as in a light guide plate LGP3" of an image display device according to Modification 2 of Example 3 of the first embodiment illustrated in FIG. 44, the interface facing the reflection surface RS (for example, RS1 to RS5) may be a curved surface that is convex toward the incident side of external light.

Specifically, the surface of the light guide plate main body 210-3" of the light guide plate LGP3" facing the through hole TH (for example, TH1 to TH5) to be the gas layer and facing the reflection surface RS (for example, RS1 to RS5) can be defined as a curved surface CS that is convex toward the incident side of the external light, and the interface between the through hole TH and the light guide plate main body 210-3" facing the reflection surface RS (for example, RS1 to RS5) can be set as a curved surface that is convex toward the incident side of the external light.

For example, the interfaces facing the reflection surfaces RS of the light guide plates LGP4, 5, and 6 of the image display device according to Example 1, the modification, and Example 2 of the second embodiment may be curved surfaces similar to those in FIGS. 41 and 42.

For example, the interfaces of the light guide plates LGP7, 8, and 9 of the image display devices according to Examples 1 to 3 of the third embodiment facing the reflection surfaces RS may be curved surfaces similar to those in FIGS. 41 and 42.

The configurations of the embodiments and modifications described above may be combined with each other within a range not contradictory.

Furthermore, the present technology can also have the following configurations.

(1) An image display device including:
a light projection system that projects image light; and
a light guide system that includes a light guide plate having a reflection surface inside, the light guide plate guiding the image light from the light projection system to an eyeball, in which
the light guide plate includes
a light guide plate main body, and
a low refractive index layer provided in the light guide plate main body and having a refractive index lower than a refractive index of the light guide plate main body, and
the reflection surface is an interface between the light guide plate main body and the low refractive index layer.

(2) The image display device according to (1), in which the low refractive index layer is a gas layer.

(3) The image display device according to (1) or (2), in which the reflection surface is a flat surface.

(4) The image display device according to any one of (1) to (3), in which the reflection surface is one interface of two of the interfaces facing each other, and the other interface of the two of the interfaces is a flat surface.

(5) The image display device according to any one of (1) to (3), in which the reflection surface is one interface of two of the interfaces facing each other, and the other interface of the two of the interfaces is a curved surface.

(6) The image display device according to any one of (1) to (5), in which the light guide plate main body includes a plurality of members integrally provided, and the low refractive index layer is provided between two members joined to each other among the plurality of members.

(7) The image display device according to (6), in which the reflection surface is an interface between one of the two members and the low refractive index layer.

(8) The image display device according to (6) or (7), in which the two members are joined with an adhesive layer interposed therebetween, the adhesive layer having an opening portion or a cutout portion opened to a side of at least one member of the two members, and the low refractive index layer is the opening portion or the cutout portion.

(9) The image display device according to (8), in which the light guide plate main body and the adhesive layer have translucency.

(10) The image display device according to (7), in which the two members are first and second members joined to each other in a thickness direction of the light guide plate main body, the light guide plate is disposed in such a manner that the first member faces the eyeball in the thickness direction of the light guide plate main body, and the one member is the first member.

(11) The image display device according to (10), in which the first member has a first fitting portion on a joint surface with the second member, the second member has a second fitting portion that is substantially fitted with the first fitting portion on a joint surface with the first member, at least the first fitting portion of the first and second fitting portions faces the low refractive index layer, and the reflection surface is an interface between the first fitting portion and the low refractive index layer.

(12) The image display device according to (11), in which there is a plurality of the low refractive index layers, one of the first and second fitting portions has a protrusion group including, as a plurality of constituent portions, a plurality of protrusions corresponding to the plurality of low refractive index layers, the other of the first and second fitting portions has a recess group including, as a plurality of constituent portions, a plurality of recesses that corresponds to the plurality of low refractive index layers and into which the plurality of protrusions is inserted respectively, each of the constituent portions of the group included in at least the first fitting portion of the protrusion group and the recess group faces the corresponding low refractive index layer of the plurality of low refractive index layers, and an interface between each of the constituent portions of the group included in the first fitting portion and the corresponding low refractive index layer is the reflection surface.

(13) The image display device according to (12), in which each of the constituent portions of the group included in the first fitting portion has a surface facing the corresponding low refractive index layer.

(14) The image display device according to (13), in which a part of the surface faces the low refractive index layer.

(15) The image display device according to (13), in which an entire region of the surface faces the low refractive index layer.

(16) The image display device according to (10), in which the light guide plate further includes an optical surface group including a plurality of optical surfaces that guides a light beam included in the image light from the light projection system to the reflection surface, and the reflection surface reflects the light beam via the optical surface group toward the eyeball.

(17) The image display device according to (16), in which the optical surface group includes a light incident surface that is one end surface of the light guide plate main body and on which the image light is incident, and a total reflection surface that is one side surface in the thickness direction of the light guide plate main body and totally reflects the image light via the light incident surface.

(18) The image display device according to (17), in which the total reflection surface totally reflects a light beam included in the image light via the light incident surface toward the reflection surface.

(19) The image display device according to (17), in which the optical surface group includes a concave mirror that is provided on an end surface of the second member facing the light incident surface and reflects a light beam included in the image light via the total reflection surface toward the reflection surface.

(20) The image display device according to (19), in which the light guide plate main body includes a protective member joined to the concave mirror.

(21) The image display device according to (17), in which the light guide plate main body includes a third member having a concave mirror that reflects a light beam included in the image light via the total reflection surface toward the reflection surface, and the concave mirror is joined to an end surface of the second member facing the light incident surface.

(22) The image display device according to (7), in which the plurality of members is stacked in a direction inclined with respect to a thickness direction of the light guide plate main body, the image light is incident into the light guide plate main body from a light incident surface that is one end surface of the light guide plate main body, and the one member is one of the two members that is farther from the light incident surface.

(23) The image display device according to (22), in which the light guide system includes a lens joined to the light incident surface, and a concave mirror that is joined to the other end surface of the light guide plate main body and reflects a light beam included in the incident image light toward the reflection surface, and one side surface in the thickness direction of the light guide plate main body is a total reflection surface that totally reflects the image light via the lens and the light incident surface toward the concave mirror.

(24) The image display device according to any one of (1) to (5), in which the light guide plate main body includes a single member, and the low refractive index layer is a through hole or a hole provided in the light guide plate main body.

(25) The image display device according to (24), in which the through hole or the hole is provided in an end surface of the light guide plate main body.

(26) The image display device according to (24) or (25), in which a cross section of the through hole or the hole parallel to the end surface is inclined with respect to a thickness direction of the light guide plate main body.

(27) The image display device according to any one of (24) to (26), in which the reflection surface is one interface of two of the interfaces facing each other between the through hole or the hole and the light guide plate main body, and the other interface of the two of the interfaces is a flat surface.

(28) The image display device according to any one of (24) to (26), in which the reflection surface is one interface of two of the interfaces facing each other between the through hole or the hole and the light guide plate main body, and the other interface of the two of the interfaces is a curved surface.

(29) The image display device according to any one of (1) to (28), in which the image light includes a plurality of light beams forming different angles of view, a plurality of the reflection surfaces is provided corresponding to the plurality of light beams, and the plurality of the reflection surfaces reflects the plurality of corresponding light beams incident and causes the light beams to be incident on the eyeball at different angles of view.

(30) The image display device according to (29), in which the plurality of the reflection surfaces is arranged in a direction intersecting a thickness direction of the light guide plate main body.

(31) The image display device according to (29) or (30), in which each of the plurality of the reflection surfaces is an inclined surface inclined with respect to a thickness direction of the light guide plate.

(32) The image display device according to (31), in which the plurality of inclined surfaces is parallel to each other.

(33) The image display device according to any one of (29) to (32), in which each of the plurality of the reflection surfaces is one interface of two of the interfaces facing each other, and the other interface of the two of the interfaces is a flat surface.

(34) The image display device according to any one of (29) to (32), in which each of the plurality of the reflection surfaces is one interface of two of the interfaces facing each other, and the other interface of the two of the interfaces is a curved surface.

(35) The image display device according to any one of (1) to (34), in which the low refractive index layer is an air layer.

(36) A method of manufacturing a light guide plate having a reflection surface inside, in which
the reflection surface is formed between two members joined to each other, and
the method includes:
a step of forming an adhesive layer by applying an adhesive to a joint surface of one member of the two members with the other member;
a step of pressing a pressing surface, which is provided with a protrusion or an overhang portion protruding toward a position corresponding to a position where the reflection surface is formed on the joint surface of the one member, against the adhesive layer to insert the protrusion or the overhang portion into the adhesive layer;
a step of curing a portion around a position of the adhesive layer where the reflection surface is formed;
a step of separating the pressing surface from the adhesive layer to form an opening portion or a cutout portion at a position of the adhesive layer where the reflection surface is formed;
a step of bringing a joint surface of the other member with the one member into close contact with the adhesive layer; and
a step of curing an entire region of the adhesive layer.

(37) A method of manufacturing a light guide plate having a reflection surface inside a light guide plate main body, the method including:
a step of producing a light guide plate base material integrated with the light guide plate main body in such a manner that a mold member penetrates at least one of a pair of end surfaces facing each other of the light guide plate main body; and
a step of pulling out the mold member from the light guide plate base material to form a through hole or a hole in the light guide plate main body.

REFERENCE SIGNS LIST

20-1, 20-1', 20-2, 30-1, 30-2, 30-3 Image display device
100-1, 100-2 Light projection system
210, 210-1, 210-2, 210-3, 210-3', 210-3", 215, 216, 217 Adhesive layer
310-1, 310-2, 310-3 Light guide plate main body 211, 311 First member
212, 212', 212", 312, 312' Second member
LGP1 to 9, 2", 2'", 3', 3" Light guide plate
210a, 310a, 410a Light incident surface
210b, 310b, 410b Total reflection surface
EB Eyeball
AP(AP1 to AP5) Opening portion
NT(NT1 to NT5) Cutout portion
RS(RS1 to RS5) Reflection surface
TD Thickness direction of light guide plate main body
L1 to L5 Light beam included in image light

The invention claimed is:

1. An image display device, comprising:
a light projection system configured to project image light; and
a light guide system that includes:
a light guide plate configured to guide the image light from the light projection system to an eyeball, wherein
the light guide plate includes:
a light guide plate main body,
a reflection surface, and
an opening portion that includes a low refractive index layer,
a refractive index of the low refractive index layer is lower than a refractive index of the light guide plate main body, and
the reflection surface is a first interface between the light guide plate main body and the low refractive index layer.

2. The image display device according to claim 1, wherein the low refractive index layer is a gas layer.

3. The image display device according to claim 1, wherein the reflection surface is a flat surface.

4. The image display device according to claim 1, wherein
the light guiding plate further includes a second interface,
the second interface is different from the first interface,
the first interface faces the second interface, and
the second interface is a flat surface.

5. The image display device according to claim 1, wherein
the light guiding plate further includes a second interface,
the second interface is different from the first interface,
the first interface faces the second interface, and
the second interface is a curved surface.

6. The image display device according to claim 1, wherein
the light guide plate main body includes a plurality of members,
the plurality of members includes a first member, and a second member joined to the first member, and
the low refractive index layer is provided between the first member and the second member.

7. The image display device according to claim 6, wherein the first interface is between one of the first member or the second member, and the low refractive index layer.

8. The image display device according to claim 7, wherein
the light guide plate further includes an adhesive layer,
the adhesive layer is between the first member and the second member, and
the opening portion is on a side of the at least one of the first member or the second member.

9. The image display device according to claim 8, wherein the light guide plate main body and the adhesive layer are translucent.

10. The image display device according to claim 7, wherein
each of the first member and the second member is in a thickness direction of the light guide plate main body, and
based on disposal of the light guide plate, the first member faces the eyeball in the thickness direction of the light guide plate main body.

11. The image display device according to claim 10, wherein
the first member includes a first fitting portion on a first joint surface,
the first joint surface is on the second member,
the second member includes a second fitting portion that fits the first fitting portion on a second joint surface,
the second joint surface is on the first member,
at least one of the first fitting portion or the second fitting portion faces the low refractive index layer, and
the first interface is between the first fitting portion and the low refractive index layer.

12. The image display device according to claim 11, wherein
the light guide plate further includes a plurality of low refractive index layers,
the plurality of low refractive index layers includes the low refractive index layer,
one of the first fitting portion or the second fitting portion includes a plurality of protrusions,
other of the one of the first fitting portion or the second fitting portion includes a plurality of recesses,
the plurality of protrusions is in the plurality of recesses,
one of the plurality of protrusions or the plurality of recesses in the first fitting portion is a plurality of constituent portions,
each of the plurality of constituent portions in the first fitting portion faces a respective low refractive index layer of the plurality of low refractive index layers,
the first interface is between one of each of the plurality of constituent portions and the respective low refractive index layer.

13. The image display device according to claim 12, wherein
each of the plurality of constituent portions in the first fitting portion includes a surface facing the respective low refractive index layer.

14. The image display device according to claim 13, wherein a part of the surface of the each of the plurality of constituent portions of the surface faces the low refractive index layer.

15. The image display device according to claim 13, wherein an entire region of the surface faces the low refractive index layer.

16. The image display device according to claim 10, wherein
the light guide plate further includes an optical surface group,
the optical surface group includes a plurality of optical surfaces,
the plurality of optical surfaces is configured to guide a light beam in the image light from the light projection system to the reflection surface, and
the reflection surface reflects the light beam via the optical surface group toward the eyeball.

17. The image display device according to claim 16, wherein the optical surface group further includes:
a light incident surface, wherein
the light incident surface is an end surface of the light guide plate main body, and the image light is incident on the light incident surface; and a total reflection surface, wherein
the total reflection surface is a side surface of the light guide plate main body in the thickness direction of the light guide plate main body, and
the total reflection surface is configured to totally reflect the image light via the light incident surface.

18. The image display device according to claim 17, wherein the total reflection surface is configured to totally reflect the light beam in the image light via the light incident surface toward the reflection surface.

19. The image display device according to claim 17, wherein
the optical surface group further includes a concave mirror on an end surface of the second member,
the concave mirror faces the light incident surface, and
the concave mirror is configured to reflect the light beam in the image light via the total reflection surface toward the reflection surface.

20. The image display device according to claim 19, wherein the light guide plate main body further includes a protective member joined to the concave mirror.

21. The image display device according to claim 17, wherein
the light guide plate main body further includes a third member,
the third member includes a concave mirror,
the concave mirror is configured to reflect the light beam in the image light via the total reflection surface toward the reflection surface,
the concave mirror is adjacent to an end surface of the second member, and
the concave mirror faces the light incident surface.

22. The image display device according to claim 7, wherein
the plurality of members is stacked in a direction inclined with respect to a thickness direction of the light guide plate main body,
the light projection system is further configured to project the image light into the light guide plate main body from a light incident surface,
the light incident surface is a first end surface of the light guide plate main body, and
the first member is at a specific distance from the light incident surface.

23. The image display device according to claim 22, wherein
the light guide system further includes:
a lens adjacent to the light incident surface; and
a concave mirror adjacent to a second end surface of the light guide plate main body,
the second end surface of the light guide plate main body is different from the first end surface of the light guide plate main body,
the concave mirror is configured to reflect a light beam in the image light toward the reflection surface,
a side surface of the light guide plate main body is in the thickness direction,
the side surface of the light guide plate main body is a total reflection surface, and
the total reflection surface is configured to totally reflect, toward the concave mirror, the image light via the lens and the light incident surface.

24. The image display device according to claim 1, wherein
the light guide plate main body includes a single member, and
the low refractive index layer is in one of a through hole or a hole in the light guide plate main body.

25. The image display device according to claim 24, wherein the one of through hole or the hole is in an end surface of the light guide plate main body.

26. The image display device according to claim 25, wherein
a cross section of the one of the through hole or the hole is parallel to the end surface of the light guide plate main body, and
the cross section of the one of the through hole or the hole is inclined with respect to a thickness direction of the light guide plate main body.

27. The image display device according to claim 24, wherein
the light guiding plate further includes a second interface,
the second interface is different from the first interface,
the first interface and the second interface are between the light guide plate main body and the one of through hole or the hole,
the first interface faces the second interface, and
the second interface is a flat surface.

28. The image display device according to claim 24, wherein
the light guiding plate further includes a second interface,
the second interface is different from the first interface,
the first interface and the second interface are between the light guide plate main body and the one of through hole or the hole,
the first interface faces the second interface, and
the second interface is a curved surface.

29. The image display device according to claim 1, wherein
the image light includes a plurality of light beams that forms a plurality of angles of view,
the light guide plate further includes a plurality of reflection surfaces,
the plurality of reflection surfaces includes the reflection surface,
each of the plurality of reflection surfaces is configured to reflect a respective light beam of the plurality of light beams,
the respective light beam is incident on the each of the plurality of reflection surfaces, and
the plurality of light beams is incident on the eyeball at the plurality of angles of view.

30. The image display device according to claim 29, wherein the each of the plurality of reflection surfaces is orthogonal to a thickness direction of the light guide plate main body.

31. The image display device according to claim 29, wherein the each of the plurality of reflection surfaces is inclined at a specific angle with respect to a thickness direction of the light guide plate.

32. The image display device according to claim 29, wherein
the plurality of reflection surfaces further includes a specific set of reflection surfaces, and
each of the specific set of reflection surfaces is parallel to the reflection surface.

33. The image display device according to claim 29, wherein
the light guide plate further includes a plurality of first interfaces, and a plurality of second interfaces different from the plurality of first interfaces,
the plurality of first interfaces includes the first interface, the plurality of first interfaces faces the plurality of second interfaces, each of the plurality of reflection surfaces is one of the plurality of first interfaces or the plurality of second interfaces, and other of the one of the plurality of first interfaces or the plurality of second interfaces is a flat surface.

34. The image display device according to claim 29, wherein the light guide plate further includes a plurality of first interfaces, and a plurality of second interfaces different from the plurality of first interfaces, the plurality of first interfaces includes the first interface, the plurality of first interfaces faces the plurality of second interfaces, each of the plurality of reflection surfaces is one of the plurality of first interfaces or the plurality of second interfaces, and other of the one of the plurality of first interfaces or the plurality of second interfaces is a curved surface.

35. The image display device according to claim 1, wherein the low refractive index layer is an air layer.

36. A method of manufacturing a light guide plate the method comprising:

forming an adhesive layer by applying an adhesive to a joint surface of a first member, wherein
the first member is adjacent to a second member different from the first member, and
a reflection surface is formed between the first member and the second member;

pressing a pressing surface against the adhesive layer to insert one of a protrusion or an overhang portion into the adhesive layer, wherein
the pressing surface includes the one of the protrusion or the overhang portion, and
the one of the protrusion or the overhang portion corresponds to a position of the reflection surface on the joint surface;

curing a portion around a first position of the adhesive layer, wherein the reflection surface is at the first position of the adhesive layer;

separating the pressing surface from the adhesive layer to form one of an opening portion or a cutout portion at a second position of the adhesive layer, wherein
the reflection surface is at the second position of the adhesive layer, and
the second position of the adhesive layer is different from the first position of the adhesive layer;

bringing a joint surface of the second member in contact with the adhesive layer; and curing an entire region of the adhesive layer.

37. A method of manufacturing a light guide plate, the method comprising:

producing a light guide plate base material integrated with a light guide plate main body in such a manner that a mold member penetrates at least one of first end surface of the light guide plate main body or a second end surface of the light guide plate main body, wherein
the second end surface of the light guide plate main body is different from the first end surface of the light guide plate main body,
the light guide plate main body includes a reflection surface, and
the first end surface faces the second end surface; and pulling out the mold member from the light guide plate base material to form one of a through hole or a hole in the light guide plate main body.

* * * * *